United States Patent
Mizoguchi et al.

(10) Patent No.: US 12,103,568 B2
(45) Date of Patent: Oct. 1, 2024

(54) VEHICLE DRIVING SUPPORT SYSTEM, SERVER APPARATUS FOR THE VEHICLE DRIVING SUPPORT SYSTEM, AND VEHICLE FOR THE VEHICLE DRIVING SUPPORT SYSTEM

(71) Applicant: SUBARU CORPORATION, Tokyo (JP)

(72) Inventors: Masato Mizoguchi, Tokyo (JP); Hajime Oyama, Tokyo (JP); Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 114 days.

(21) Appl. No.: 17/554,559

(22) Filed: Dec. 17, 2021

(65) Prior Publication Data
US 2022/0204047 A1   Jun. 30, 2022

(30) Foreign Application Priority Data
Dec. 28, 2020 (JP) ................................. 2020-218967

(51) Int. Cl.
*B60W 60/00* (2020.01)

(52) U.S. Cl.
CPC .. *B60W 60/0059* (2020.02); *B60W 2554/4045* (2020.02); *B60W 2554/4049* (2020.02)

(58) Field of Classification Search
CPC ..... B60W 60/0059; B60W 2554/4045; B60W 2554/4049; B60W 60/001;
(Continued)

(56) References Cited

U.S. PATENT DOCUMENTS 10,089,876 B1 * 10/2018 Ramasamy ............ G05D 1/028
2011/0184605 A1 * 7/2011 Neff ...................... G05D 1/0088
701/25
(Continued)

FOREIGN PATENT DOCUMENTS

JP    2015-102893 A    6/2015
JP    2018-169895 A    11/2018
(Continued)

OTHER PUBLICATIONS

Office Action dated on May 14, 2024 issued in the corresponding Japanese Patent Application No. 2020-218967, w/ English Translation.

*Primary Examiner* — Peter D Nolan
*Assistant Examiner* — Ashley L Redhead, Jr.
(74) *Attorney, Agent, or Firm* — Rimon P.C.

(57) ABSTRACT

A vehicle driving support system capable of supporting driving of a vehicle that travels on a road includes a notifier, and an acquirer. In a case where there is a first vehicle that moves between lanes, the notifier is configured to, provide notification of presence of the first vehicle to a second vehicle travelling in a target lane into which the first vehicle is to move. The acquirer is configured to acquire a size of a merging space that is to be provided by the second vehicle for merging of the first vehicle. In a case where the first vehicle is travelling under autonomous operation or assisted operation, the acquirer is configured to acquire the size of the merging space such that the size of the merging space is longer than when acquired in a case where the first vehicle is travelling under manual operation.

16 Claims, 16 Drawing Sheets

(58) Field of Classification Search
CPC ....... B60W 2554/804; B60W 2555/60; B60W 2556/65; B60W 30/18163; B60W 2754/30; B60W 2756/10
See application file for complete search history.

(56) References Cited

U.S. PATENT DOCUMENTS

| | | | |
|---|---|---|---|
| 2018/0079419 A1 | 3/2018 | Yamamoto | |
| 2019/0035275 A1* | 1/2019 | Nishi | G08G 1/163 |
| 2019/0193737 A1* | 6/2019 | Likhachev | G05D 1/0289 |
| 2019/0286133 A1* | 9/2019 | Bielby | B60W 50/082 |
| 2020/0023839 A1* | 1/2020 | Yan | H04W 4/46 |
| 2020/0342760 A1* | 10/2020 | Vassilovski | G05D 1/0289 |
| 2021/0109533 A1 | 4/2021 | Nakadai et al. | |
| 2021/0229656 A1* | 7/2021 | Dax | G08G 1/09626 |
| 2022/0204047 A1* | 6/2022 | Mizoguchi | B60W 60/0059 |
| 2022/0242442 A1* | 8/2022 | Mcneely | G06V 20/588 |
| 2022/0262253 A1* | 8/2022 | Wu | G08G 1/167 |
| 2023/0154204 A1* | 5/2023 | Kahn | B60W 50/14 |
| | | | 382/104 |

FOREIGN PATENT DOCUMENTS

| | | |
|---|---|---|
| WO | 2016/147622 A1 | 9/2016 |
| WO | 2018/179237 A1 | 10/2018 |

* cited by examiner

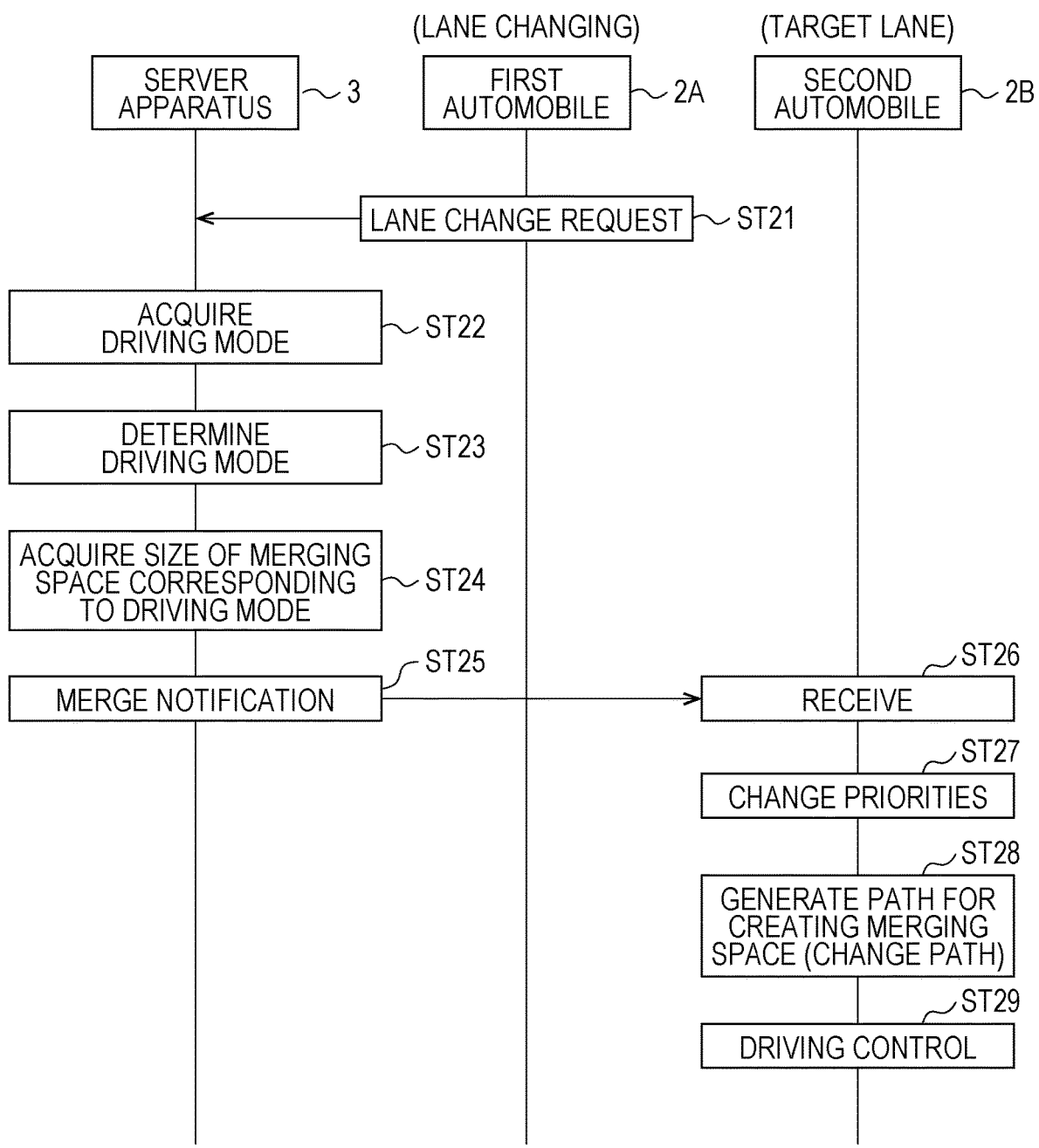

VEHICLE DRIVING SUPPORT SYSTEM, SERVER APPARATUS FOR THE VEHICLE DRIVING SUPPORT SYSTEM, AND VEHICLE FOR THE VEHICLE DRIVING SUPPORT SYSTEM

CROSS-REFERENCE TO RELATED APPLICATIONS

The present application claims priority from Japanese Patent Application No. 2020-218967 filed on Dec. 28, 2020, the entire contents of which are hereby incorporated by reference.

BACKGROUND

The disclosure relates to a vehicle driving support system, a server apparatus for the vehicle driving support system, and a vehicle for the vehicle driving support system.

International Publication No. 2018/179237 discloses a control system provided to a vehicle. With the control system, a plan for a non-travel area, which is designated as an area where autonomous vehicles are not to travel, is transmitted between vehicles.

International Publication No. 2016/147622 discloses a vehicle-to-vehicle communication system for communication between vehicles that are moving. According to the disclosed vehicle-to-vehicle communication system, when a vehicle intends to change lanes, the system identifies a trailing through-traffic vehicle in a target lane by using a sensor mounted to the lane-changing vehicle, and transmits information requesting for a lane change in unicast mode to the trailing through-traffic vehicle by using the identification number of the trailing through-traffic vehicle. After a reply indicating approval of the requested lane change is received by on-board communication equipment from the trailing through-traffic vehicle in unicast mode, the system controls driving of the lane-changing vehicle to perform the lane change.

SUMMARY

An aspect of the disclosure provides a vehicle driving support system capable of supporting driving of a vehicle that travels on a road. The vehicle driving support system includes a notifier, and an acquirer. In a case where there is a first vehicle that moves between lanes, the notifier is configured to provide notification of presence of the first vehicle to a second vehicle travelling in a target lane into which the first vehicle is to move. The acquirer is configured to acquire a size of a merging space that is to be provided by the second vehicle for merging of the first vehicle. In a case where the first vehicle is travelling under autonomous operation or assisted operation, the acquirer is configured to acquire the size of the merging space such that the size of the merging space is longer when acquired in a case where the first vehicle is travelling under manual operation.

An aspect of the disclosure provides a server apparatus for a vehicle driving support system capable of supporting driving of a vehicle that travels on a road. The vehicle driving support system includes a notifier and an acquirer. In a case where there is a first vehicle that moves between lanes, the notifier is configured to provide notification of presence of the first vehicle directly or via the first vehicle to a second vehicle travelling in a target lane into which the first vehicle is to move. The acquirer is configured to acquire a size of a merging space that is to be provided by the second vehicle for merging of the first vehicle. The server apparatus includes at least the notifier. In a case where the first vehicle is travelling under autonomous operation or assisted operation, the acquirer is configured to acquire the size of the merging space such that the size of the merging space is longer than when acquired in a case where the first vehicle is travelling under manual operation.

An aspect of the disclosure provides a vehicle for a vehicle driving support system capable of supporting driving of a vehicle that travels on a road. The vehicle driving support system includes a notifier, an acquirer, a communicator, and a controller. in a case where there is a first vehicle that moves between lanes, the notifier is configured to provide notification of presence of the first vehicle directly or via the first vehicle to a second vehicle travelling in a target lane into which the first vehicle is to move. The acquirer is configured to acquire a size of a merging space that is to be provided by the second vehicle for merging of the first vehicle. The communicator is capable of receiving, from the notifier or from the first vehicle, the notification provided by the notifier. The controller is capable of executing driving control for autonomous operation or assisted operation during travel on a road. The vehicle includes at least the notifier and the controller. In a case where the first vehicle is travelling under autonomous operation or assisted operation, the acquirer is configured to acquire the size of the merging space such that the size of the merging space is longer than when acquired in a case where the first vehicle is travelling under manual operation. The controller is configured to, in response to the communicator receiving the notification provided by the notifier, serve as the controller of the second vehicle, and execute driving control for autonomous operation or assisted operation to create the merging space having the size acquired by the acquirer.

An aspect of the disclosure provides a vehicle driving support system capable of supporting driving of a vehicle that travels on a road. The vehicle driving support system includes circuitry. In a case where there is a first vehicle that moves between lanes, the circuitry is configured to provide notification of presence of the first vehicle to a second vehicle travelling in a target lane into which the first vehicle is to move. The circuitry is configured to acquire a size of a merging space that is to be provided by the second vehicle for merging of the first vehicle. In a case where the first vehicle is travelling under autonomous operation or assisted operation, the circuitry is configured to acquire the size of the merging space such that the size of the merging space is longer when acquired in a case where the first vehicle is travelling under manual operation.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 9 is a timing chart of a merge control executed in the driving support system according to the first embodiment;

DETAILED DESCRIPTION

Figure 1:
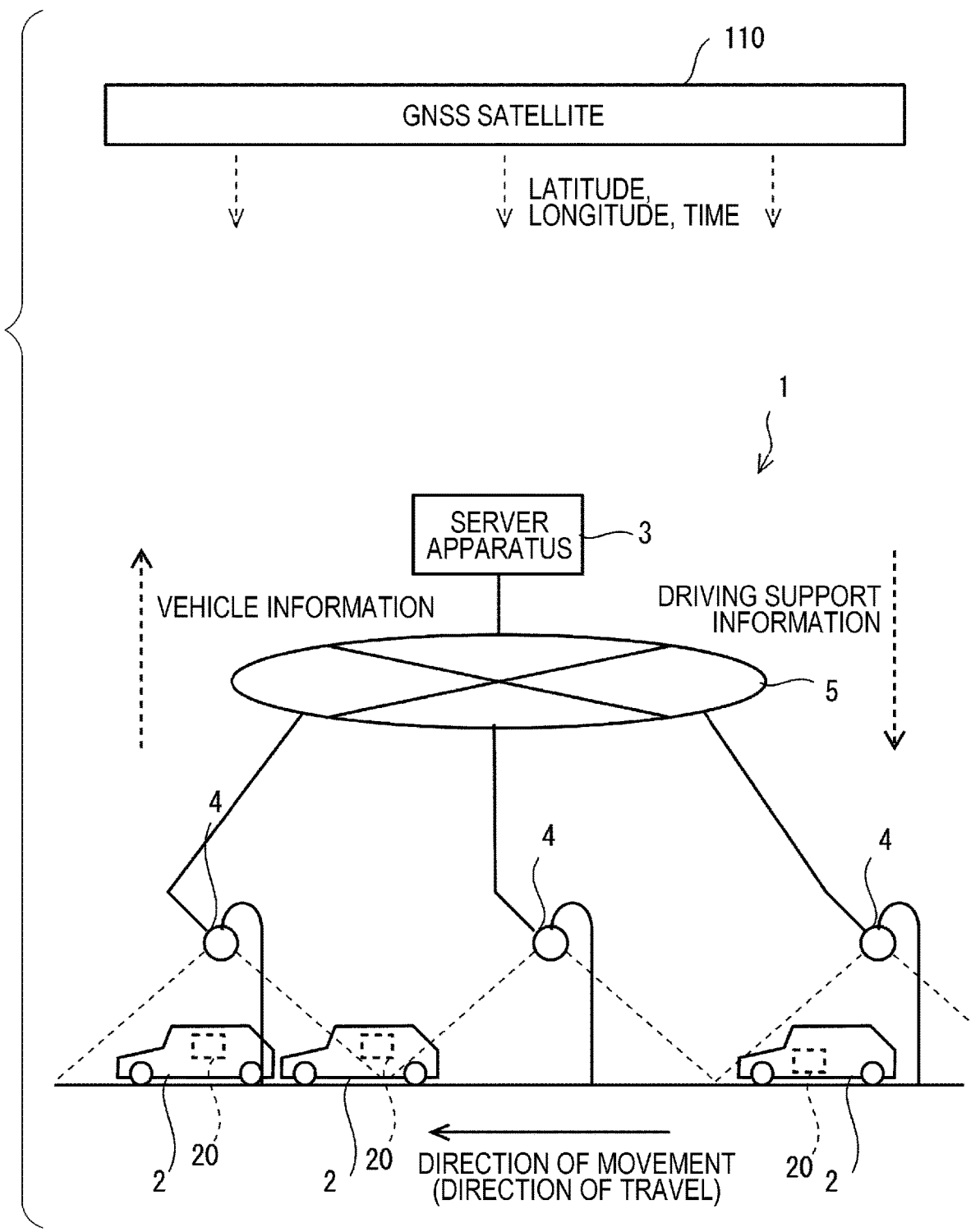
FIG. 1 illustrates a driving support system according to an embodiment of the disclosure.

For vehicles such as automobiles, technologies are being developed that help enhance safety for autonomously driven vehicles in performing a lane change or other maneuver by allowing such vehicles to communicate with other vehicles.

However, even if controls based on such related art technologies are realized, this may not necessarily provide safety or smooth movement for vehicular driving during a merge or other maneuver.

One such exemplary situation is where a first vehicle, which intends to move between multiple lanes under manual operation with its occupant manually operating the driving of the vehicle, is attempting to move into a congested or crowded lane. In such a situation, it is conceivable that contrary to predictions made by such autonomous operation, the first vehicle will cut in front of a second vehicle, which is travelling in the target lane under autonomous operation with higher traffic priority according to traffic priority rules. In such a case, the first vehicle and the second vehicle are likely to come close to each other. Such a cut-in maneuver of the first vehicle can potentially disrupt the autonomous operation control of the second vehicle. The disruption of autonomous operation control of the second vehicle can trigger execution of emergency control. In emergency control, the second vehicle basically comes to a stop.

Another exemplary situation is where a first vehicle, which intends to move between multiple lanes under autonomous operation or assisted operation, is attempting to move from its current lane into a congested or crowded lane. In such a situation, if vehicles travelling in the target lane do not create enough merging space for the first vehicle to merge into, or fail to do so in time, it may not be possible for the first vehicle to execute a control for moving into the congested or crowded target lane. This may result in the first vehicle continuing to move in the current lane without being able to move into the target lane. If the current lane is that of a merging road merging into an arterial highway, the first vehicle travels to the end of the merging section of the merging road and then comes to a stop at that position. Even when the first vehicle attempts to move to the target lane after coming to a stop, the first vehicle continues to stop at the current position unless enough merging space is provided by the vehicles on the arterial highway. If there is a large difference in speed between the first vehicle and the vehicles on the arterial highway, it may be difficult for the first vehicle to execute a merge onto the arterial highway unless a sufficiently long merging space relative to the speed difference becomes available. As for the length of a merging space to be provided for the first vehicle intending to move between lanes under autonomous operation or assisted operation as described above, a length substantially corresponding to the size of the first vehicle may not be enough. Unless enough merging space is available for the first vehicle intending to change lanes under autonomous operation or assisted operation, the vehicle's occupant may feel uneasy about autonomous operation.

It is therefore desirable to improve existing driving support systems that support vehicle driving.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

FIG. 1 illustrates a driving support system 1 according to a first embodiment of the disclosure.

The driving support system 1 in FIG. 1 includes multiple automobiles 2, and a server apparatus 3. The automobiles 2 are capable of travelling on a road under autonomous operation or assisted operation. The server apparatus 3 collects vehicle information about driving of the automobiles 2 or other conditions, and transmits driving support information to the automobiles 2.

The automobile 2 is an example of a vehicle. Other examples of vehicles include motorcycles, carts, and personal mobility devices. Such a vehicle may be any vehicle that, under driving control executed by a controller 20 provided to the vehicle, moves with the driving force of an engine or motor serving as a drive device 26, has its direction of travel changed through actuation of a steering device 24, and decelerates or stops through actuation of a braking device 25.

The automobile 2 may be basically any automobile capable of travelling on a road under autonomous operation or assisted operation controlled by the controller 20. The automobile 2 may be an automobile capable of travelling on a road under manual operation. In the case of manual operation, the controller 20 of the automobile 2 may notify the driver of information such as driving support information.

FIG. 1 illustrates a global navigation satellite system (GNSS) satellite 110. The GNSS satellite 110 is located in the Earth's satellite orbit, and transmit radio waves toward the Earth's surface. The radio waves from the GNSS satellite 110 contain information on latitude, longitude, and altitude representing its own position, and information on absolute time synchronized between multiple satellites. Receiving radio waves from multiple GNSS satellites 110 makes it possible to obtain information on latitude, longitude, and altitude accurately representing the position of the point of reception, and accurate time at the point of reception.

The driving support system 1 in FIG. 1 includes multiple base stations 4, and a communication network 5 to establish a communication channel between each automobile 2 that is moving, and the server apparatus 3.

Exemplary base stations 4 include the base stations 4 for mobile communication network services such as those for mobile terminals, and the base stations 4 for ITS services provided to the automobiles 2. Exemplary base stations 4 for mobile communication network services include the base stations 4 of the fourth generation, and the base stations 4 of the fifth generation. The base stations 4 may be either securely installed on a road shoulder, a road surface, or a building, or provided to a mobile object such as the automobile 2, a ship, a drone, or an airplane.

Each base station 4 establishes a wireless communication channel with each automobile 2 existing within its radio coverage area to thereby exchange information with the automobile 2. As the automobile 2 travels on a road, the base stations 4 with which the automobile 2 establishes a communication channel are switched. Consequently, for example, the automobile 2 is able to, while travelling on a road, switch multiple base stations 4 arranged along the road to thereby continue establishing a wireless communication channel for communication with the server apparatus 3. Wireless communication channels established between the automobiles 2 and the base stations 4 of the fifth generation are capable of exchanging far more information than those established between the automobiles 2 and the base stations 4 of the fourth generation. The base stations 4 of the fifth generation have advanced information processing capability. Each such base station 4 of the fifth generation thus makes it possible to achieve direct communication between multiple automobiles 2 that have established a wireless communication channel with the base station 4, or achieve direct communication between multiple automobiles 2 in cooperation with other base statins 4. This allows the automobiles 2 to perform V2V communication via the base station 4 even for cases where it may not be possible to obtain a line-of-sight communication environment for V2V communication. The base stations 4 of the fifth generation are capable of executing some or all of the functions of the server apparatus 3. The server apparatus 3 may be implemented in multiple base stations 4 in a distributed fashion.

The communication network 5 may be implemented by, for example, a communication network dedicated to mobile communication network services, a communication network dedicated to ITS services, or the Internet that links communication networks to each other. The communication network 5 may be a new dedicated communication network provided for the driving support system 1, or may be a communication network including such a dedicated communication network.

The Internet is a public and open wide-area network. Other examples of wide-area networks include dedicated communication networks for use in intelligent transportation systems such as advanced driver-assistance systems (ADAS), and ATM switching networks dedicated to telephone switching. The driving support system 1 may use such a wide-area communication network instead of or in addition to a dedicated network. Although open networks tend to have longer transmission delays than closed networks, some degree of privacy can be provided by encoding data such as by encryption. It is to be noted, however, that in comparison to using the Internet or other open networks, using a dedicated network allows low-delay, high-capacity high-speed data communication to be executed in a stable manner between each of the base stations 4 and the server apparatus 3. Even if the dedicated network used is one that exchanges information by use of asynchronous frames based on the TCP/IP protocol or other protocols, and retransmits frames due to, for example, collision detection, the resulting transmission delay is unlikely to become excessive. Dedicated networks allow for reduced transmission delay in comparison to the Internet via which large amounts of data are often exchanged asynchronously.

Vehicle information refers to information representing the driving condition of each automobile 2. For example, vehicle information includes information such as current or latest position, driving road, driving lane, speed, rate of acceleration, steering, braking, or acceleration/deceleration.

Driving support information refers to information for controlling or supporting driving of each automobile 2. For example, for the automobile 2 travelling under autonomous operation or assisted operation, driving support information includes information instructing or requesting the automobile 2 to perform acceleration/deceleration, steering, or following of the preceding automobile.

The server apparatus 3 generates driving support information for multiple automobiles 2 in a manner that causes the automobiles 2 to follow traffic priority rules. The controllers 20 of multiple automobiles 2 are thus able to basically execute driving control in such a way as to reduce potential conflict between the driving operations of the automobiles 2.

Figure 2:
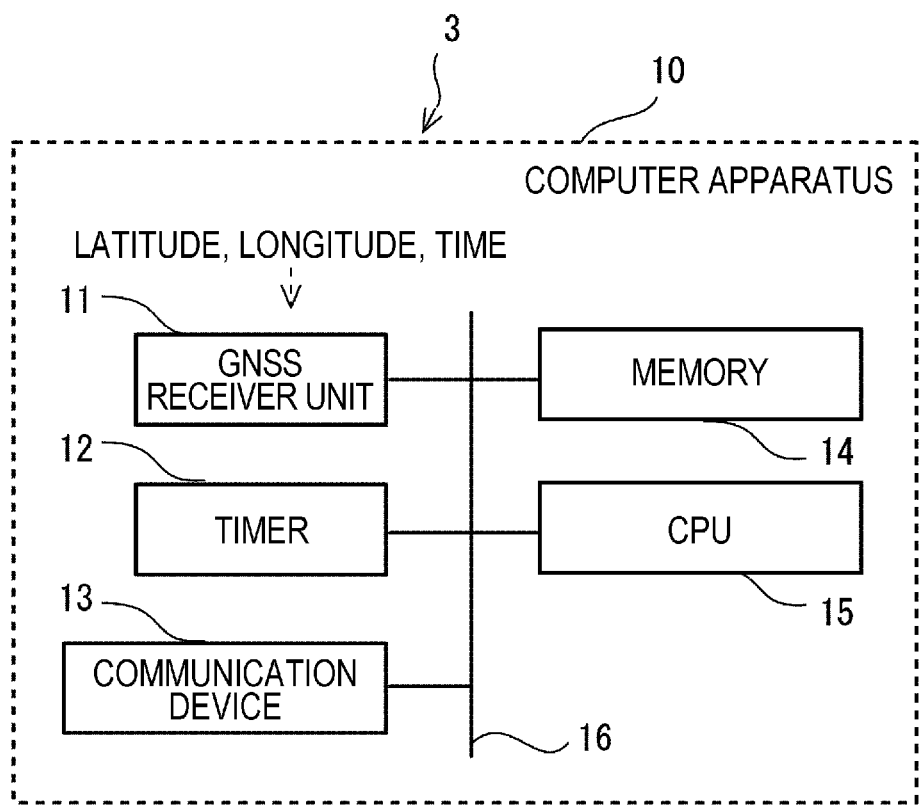
FIG. 2 illustrates an exemplary hardware configuration of a computer apparatus, which may in one example serve as a server apparatus illustrated in FIG. 1.

FIG. 2 illustrates an exemplary hardware configuration of a computer apparatus 10. In one example, the computer apparatus 10 may serve as the server apparatus 3 illustrated in FIG. 1.

The server apparatus 3 may be implemented as the computer apparatus 10 that controls driving of multiple automobiles 2.

The server apparatus 3 in FIG. 2 includes a GNSS receiver unit 11, a timer 12, a communication device 13, a memory 14, a central processing unit (CPU) 15, and a bus 16 to which these components are coupled.

The communication device 13 is linked to the communication network 5. The communication device 13 exchanges information with other devices linked to the communication network 5, for example, the base stations 4 or the automobiles 2.

The timer 12 measures point in time, length of time, or period of time.

The GNSS receiver unit 11 receives radio waves from the GNSS satellite 110 to obtain current time. The server apparatus 3 may use the current time obtained by the GNSS receiver unit 11 to correct the point in time measured by the timer 12.

The memory 14 may be a ROM that stores data and a program to be executed by the CPU 15. The memory 14 may include a RAM to store data from the CPU 15 that is executing a program. The memory 14 may be, for example, a combination of a semiconductor memory and a hard disk device.

The CPU 15 reads a program from the memory 14, and executes the program. A server controller is thus implemented in the server apparatus 3.

The CPU 15 serving as a server controller manages the overall operation of the server apparatus 3.

The CPU 15 serving as a server controller functions as the controller 20 of the overall driving support system 1. The CPU 15 manages and controls driving of multiple automobiles 2. The CPU 15 collects field information including multiple pieces of vehicle information representing the respective driving conditions of the automobiles 2, and generates driving support information based on the collected field information to control or support driving of the automobiles 2. The CPU 15 generates driving support information for the automobiles 2 that causes the automobiles 2 to basically follow traffic priority rules. This may provide safety and a sense of security for driving of the automobiles 2.

Unlike the configuration in FIG. 1, the server apparatus 3 may be implemented in multiple computer apparatuses 10.

The server apparatus 3 may be distributed among multiple computer apparatuses 10 for each individual function of the server apparatus 3. The functions of the server apparatus 3 may be executed by multiple computer apparatuses 10.

Some or all of the functions of the server apparatus 3 may be, for example, distributed among multiple base stations 4.

Multiple computer apparatuses 10 that may serve as the server apparatus 3 may be implemented in a multilayered structure. Such multiple computer apparatuses 10 that may serve as the server apparatus 3 may include, for example, lower-level computer apparatuses 10 distributed among multiple base stations 4, and higher-level computer apparatuses 10 that manage the distributed lower-level computer apparatuses 10 in a centralized manner.

In either case, with multiple computer apparatuses 10 functioning as the server apparatus 3 in cooperation with each other, processing load on each individual computer apparatus 10 can be reduced.

By appropriately distributing multiple server apparatuses 3 across the communication network 5, the transmission range for each piece of information can be limited to thereby reduce transmission load or transmission delay.

Each of multiple distributed server apparatuses 3 corresponding to the associated one of multiple base stations 4 may be integrated with the base station 4 and serve as one of the functions of the base station 4. Such a base station 4 having the function of a distributed server apparatus allows for reduced information transmission delay time. The base station 4 having the function of a distributed server apparatus is able to, for example, take over and execute a portion of the processing to be performed by the driving support system for the automobile 2, and thus function as one component of the driving support system for the automobile 2. Multiple base stations 4 may, for example, implement the function of the server apparatus 3 through cooperative processing in which the base stations 4 communicate with each other without the intermediation of another server apparatus 3. In this case, each of the base stations 4 securely installed on a road may, for example, classify information about multiple automobiles 2 covered within the communication area of the base station 4 into multiple road maps based on information such as positions within the corresponding communication area, group information based on the road classification, and relay and transfer the grouped information to other base stations 4. No server apparatus 3 separate from the base stations 4 may be provided. The processing to be performed by the server apparatus 3 may be implemented in a distributed fashion through cooperative processing between the base stations 4 and the server apparatus 3.

With the driving support system 1 configured as described above, each automobile 2 establishes a wireless communication channel with at least one base station 4. Each automobile 2 is able to continue establishing a wireless communication channel by switching the base stations 4 while travelling. This allows information to be exchanged between each of the automobiles 2 and the server apparatus 3.

Each of the automobiles 2 is capable of transmitting vehicle information representing the driving condition of the automobile 2 to the server apparatus 3 repeatedly at relatively short intervals of time. Exemplary vehicle information to be transmitted by each automobile 2 include the automobile's driving information, occupant information pertaining to users, or the automobile's surroundings information. The automobile's driving information includes, in addition to the direction of travel or speed of travel, for example, current location, destination, and orientation or movement of the automobile's body. An example of information representing the orientation of the automobile's body is yaw rate.

The server apparatus 3 is capable of generating driving support information for each of the automobiles 2, and transmitting the generated driving support information to the automobile 2. The server apparatus 3 may transmit driving support information generated for multiple automobiles 2 to another server apparatus.

Figure 3:
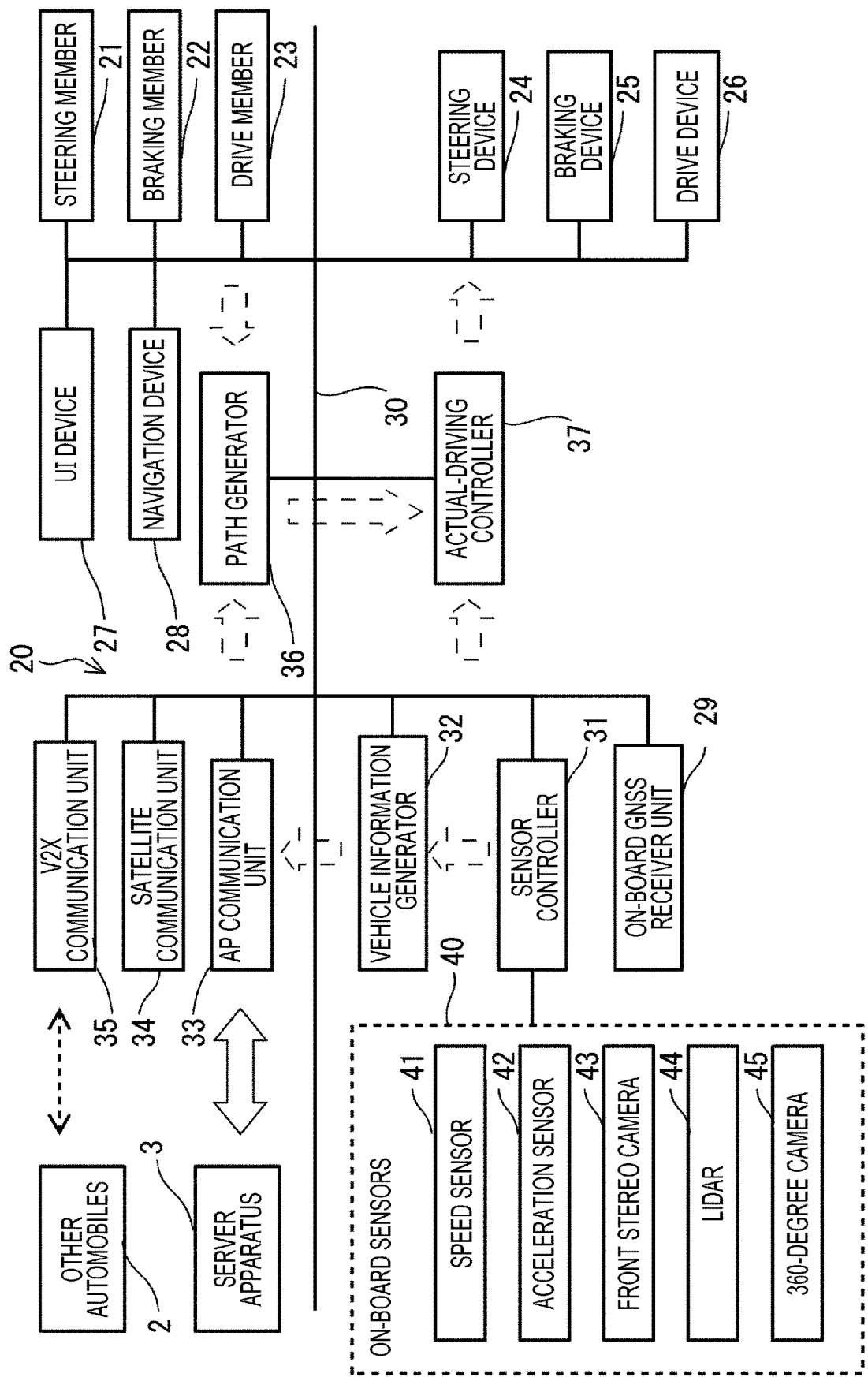
FIG. 3 illustrates an exemplary hardware configuration of a controller of each automobile illustrated in FIG. 1.

FIG. 3 illustrates an exemplary hardware configuration of the controller 20 of each automobile 2 illustrated in FIG. 1.

As with the controller 20 of a common automobile 2, the controller 20 of the automobile 2 in FIG. 3 includes a steering member 21, a braking member 22, a drive member 23, the steering device 24, the braking device 25, the drive device 26, a UI device 27, a navigation device 28, an on-board GNSS receiver unit 29, and a vehicle network 30 to which the above-mentioned components are linked.

The following other components are also linked to the vehicle network 30: a sensor controller 31, a vehicle information generator 32, an AP communication unit 33, a satellite communication unit 34, a V2X communication unit 35, a path generator 36, and an actual-driving controller 37.

The sensor controller 31, the vehicle information generator 32, the path generator 36, and the actual-driving controller 37 may be implemented by the same computer apparatus 10 as that illustrated in FIG. 2, and linked to the vehicle network 30. In this case, the CPU 15 of the computer apparatus 10 may be an electronic control unit (ECU).

The vehicle network 30 includes, for example, multiple bus cables coupled to the members and devices mentioned above, and a central gateway (CGW) to which the bus cables are coupled. Each of the members and devices mentioned above linked to the vehicle network 30 is assigned a different ID serving as identification information. The central gateway monitors the bus cables coupled to the central gateway, and in response to detecting data destined to a destination coupled to a bus cable different from a source, outputs the data to the destination bus cable. The members and devices mentioned above basically output data periodically. A source ID and a destination ID are attached to the data. Other members or devices each monitor the bus cables, acquire data containing its own ID as a destination, and execute processing using the acquired data.

The steering member 21 is operated by the driver of the automobile 2 to perform steering. The steering member 21 is, for example, a steering wheel.

The braking member 22 is operated by the driver of the automobile 2 to perform braking. The braking member 22 is, for example, a brake pedal, or a parking brake lever.

The drive member 23 is operated by the driver of the automobile 2 for drive purposes. The drive member 23 is, for example, an accelerator pedal, a select lever of transmission, or a paddle.

The steering device 24 is a device to change the direction of the wheels of the automobile 2 to thereby change the direction in which the automobile 2 travels.

The braking device 25 is a device to reduce the rotation of the automobile 2 to thereby decelerate or stop the automobile 2.

The drive device 26 is a device to rotate the wheels of the automobile 2 to thereby accelerate or maintain the speed of the automobile 2. The drive device 26 is, for example, a gasoline engine, or an electric motor. Torque from a gasoline engine, torque from an electric motor, or the combined torque from the gasoline engine and the electric motor is transmitted to the wheels via a transmission or other components.

The UI device 27 is operated by, for example, the occupant of the automobile 2. The UI device 27 includes, for example, user interface members such as a liquid crystal panel, a head-up display (HUD), a warning light, a metering device, a touchscreen, an in-cab camera, and a contactless-operation detection device. The liquid crystal panel may be either provided to the metering device in front of the driver, or provided to the center console. The on-board GNSS receiver unit 29 receives radio waves from the GNSS satellite 110, and generates information representing the current position and time for the automobile 2. The on-board GNSS receiver unit 29 may generate information representing the orientation or direction of travel of the automobile 2.

The navigation device 28 includes data such as map data or destination data, and generates and guides a route to a destination of the automobile 2. High precision three-dimensional map data may be used as the map data. The direction of travel or route from the current position may be displayed on the liquid crystal panel, the HUD, the metering device, or other user interface members of the UI device 27.

On-board sensors 40 coupled to the sensor controller 31 include components such as a speed sensor 41, an acceleration sensor 42, a front stereo camera 43, a LIDAR 44, and a 360-degree camera 45.

The speed sensor 41 detects the speed of the automobile 2.

The acceleration sensor 42 detects the rate of acceleration of the automobile 2 along three axes. The acceleration sensor 42 may function as a gyroscope sensor that detects yaw rate or other information.

The front stereo camera 43 captures an image of an area in front of the automobile 2 in the direction of travel. The front stereo camera 43 may be capable of capturing an image of the automobile 2 in the lateral direction by use of a wide-angle lens. The front stereo camera 43 may detect objects within its capture range, such as other automobiles, other mobile objects, or structures.

The LIDAR 44 outputs laser light to the surroundings of the automobile 2, and detects objects in the surroundings of the automobile 2 based on information such as the amount of light reflected and the time it takes for the reflected light to be received. Examples of objects in the surroundings of the automobile 2 include other automobiles, other mobile objects, and structures.

The 360-degree camera 45 captures an image of the surroundings of the automobile 2. The 360-degree camera 45 may capture objects within its capture range, such as other automobiles, other mobile objects, and structures.

The sensor controller 31 may detect the movements of other automobiles or other mobile objects based on information detected by the on-board sensors 40 mentioned above.

The sensor controller 31 may output detected information, and information generated based on the detected information to the vehicle network 30.

The vehicle information generator 32 collects information related to, for example, vehicular driving via the vehicle network 30. The vehicle information generator 32 generates vehicle information including the collected information, and outputs the generated vehicle information to the vehicle network 30.

The AP communication unit 33 establishes a wireless communication channel between the base station 4 with which the AP communication unit 33 is able to communicate. The AP communication unit 33 acquires transmit information from the vehicle network 30, and transmits the acquired information to the base station 4 via the established wireless communication channel. The AP communication unit 33 receives information from the base station 4 via the established wireless communication channel, and outputs the received information to the vehicle network 30.

The satellite communication unit 34 establishes a wireless communication channel with a communication satellite (not illustrated). The satellite communication unit 34 acquires transmit information from the vehicle network 30, and transmits the acquired information to the communication satellite via the established wireless communication channel. The satellite communication unit 34 receives information from the communication satellite via the established wireless communication channel, and outputs the received information to the vehicle network 30.

The V2X communication unit 35 executes V2V communication with other automobiles. The V2X communication unit 35 may execute V2V communication with other automobiles via the base station 4. The V2X communication unit 35 may execute V2X communication with entities other than automobiles, for example, mobile terminals of pedestrians. The V2X communication unit 35 acquires transmit information from the vehicle network 30, and transmits the acquired information to other automobiles. The V2X communication unit 35 receives information from other automobiles, and outputs the received information to the vehicle network 30.

The controller 20 of each automobile 2 is thus capable of, for example, exchanging information with the server apparatus 3 via the AP communication unit 33 and the base station 4. The controller 20 of each automobile 2 is capable of transmitting vehicle information of the automobile 2 to the server apparatus 3, and receiving driving support information or other information from the server apparatus 3.

The path generator 36 generates, based on driving support information or other information received from the server apparatus 3 or other entities, the immediate short-distance path to be travelled by the automobile 2.

For example, if driving support information includes direction of travel, speed of travel, distance of travel, or other such information, the path generator 36 basically generates the path to be travelled in accordance with the driving support information.

If driving support information includes drivable area, the path generator 36 basically generates the path to be travelled within the drivable area.

The path generator 36 may generate the immediate short-distance path to be travelled by the automobile 2 by using information from on-board equipment, such as the sensor controller 31, the navigation device 28, the steering member 21, the braking member 22, the drive member 23, and the UI device 27. The path generator 36 may determine which one of internally obtained information and externally received information is to be used over the other information, and generate the immediate short-distance path to be travelled by the automobile 2 by using information selected based on the determination.

The path generator 36 may display information representing the generated path on the liquid crystal panel, the HUD, the warning light, or other user interface members of the UI device 27.

The actual-driving controller 37 is configured to, if the driving mode of the automobile 2 is, for example, autonomous operation or assisted operation, actually control driving of the automobile 2 by controlling actuation of the steering device 24, the braking device 25, and the drive device 26 by using information from the path generator 36, and information from on-board equipment such as the sensor controller 31, the navigation device 28, the steering member 21, the braking member 22, the drive member 23, and the UI device 27.

In this case, the actual-driving controller 37 controls driving of the automobile 2 at very short intervals of time, irrespective of the presence or absence of information provided from the path generator 36. The actual-driving controller 37 basically executes driver assistance such as avoidance of collision or conflict with other automobiles, or lane-keeping or following of the preceding automobile. The actual-driving controller 37 normally executes driving control in accordance with information provided from the path generator 36, and also in such a way as to provide driving safety and reliability.

The actual-driving controller 37 may be configured to, if the driving mode of the automobile 2 is, for example, manual operation, control driving of the automobile 2 by controlling actuation of the steering device 24, the braking device 25, and the drive device 26 by using information from the steering member 21, the braking member 22, the drive member 23, the UI device 27, and other on-board equipment operated by the occupant of the automobile 2. At this time, the actual-driving controller 37 may execute a limited amount of driver assistance so as not to affect the operation performed by the occupant.

The actual-driving controller 37 may, in the event of an emergency such as imminent collision, control the automobile 2 in such a way as to avoid the collision and further reduce the effect of the collision. In this case, the actual-driving controller 37 may output an instruction that instructs an occupant crash protection such as an airbag device (not illustrated) to activate. The actual-driving controller 37 may display information about the state of control on the liquid crystal panel, the HUD, the warning light, or other user interface members of the UI device 27.

As described above, the controller 20 of each automobile 2 in FIG. 3 is capable of controlling driving of the automobile 2 through either one of the following operations: autonomous operation in which the automobile 2 travels in accordance with driving support information generated in the server apparatus 3; independent autonomous operation; assisted operation; and manual operation.

The controller 20 is capable of controlling driving of the automobile 2 by switching the driving modes of the automobile 2 such as autonomous operation, assisted operation, and manual operation modes while the automobile 2 is travelling.

Figure 4:
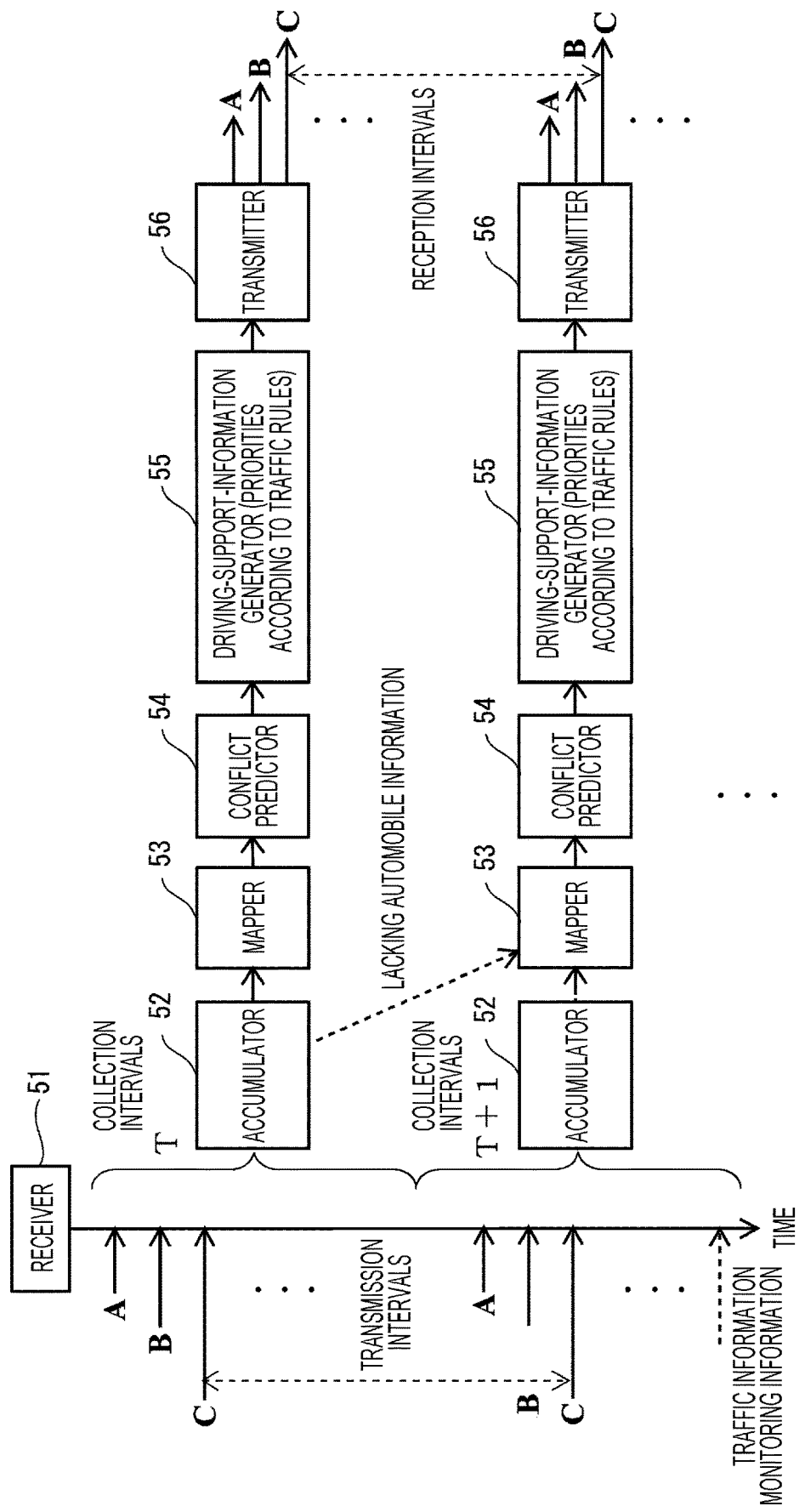
FIG. 4 illustrates major functions and operations implemented in the server apparatus illustrated in FIG. 1.

FIG. 4 illustrates major functions and operations implemented in the server apparatus 3 illustrated in FIG. 1.

FIG. 4 illustrates the following major functional units of the server apparatus 3: a receiver 51; an accumulator 52; a mapper 53; a conflict predictor 54; a driving-support-information generator 55 (to be also referred to simply as generator 55 hereinafter); and a transmitter 56.

The receiver 51 receives, by means of the communication device 13, vehicle information from multiple automobiles 2 that represents information such as the driving conditions of the automobiles 2. Exemplary vehicle information to be transmitted by each automobile 2 and received by the receiver 51 include the automobile's driving information, occupant information pertaining to users, and the automobile's surroundings information. For example, the automobile's driving information includes, in addition to the direction of travel or speed of travel, information such as current location, destination, and orientation or movement of the automobile's body. An example of information representing the orientation of the automobile's body is yaw rate. The receiver 51 may receive field information related to driving of the automobile 2 and transmitted from an entity other than the automobile 2. Exemplary field information may include, in addition to vehicle information transmitted by each automobile 2 and related to the automobile 2 that has transmitted the vehicle information, monitoring information about a road provided by a camera or other devices installed on the road, information representing the driving conditions of the automobiles 2 acquired from other server apparatuses, and regional traffic information.

The accumulator 52 accumulates, in the memory 14, field information received from the receiver 51 and including vehicle information provided from multiple automobiles 2. Vehicle information from the automobiles 2 is thus collected and accumulated in the memory 14.

The mapper 53 maps the driving conditions of multiple automobiles 2 by using field information accumulated in the accumulator 52. The mapper 53 may map the collected driving conditions of the automobiles 2 onto maps such as current-time road maps 61 and 62, which are road maps as of the current moment in time and generated for each individual road or lane.

If there is any information lacking in the latest field information accumulated in the accumulator 52, the mapper 53 may compensate for the lacking information with past field information previously accumulated in the accumulator 52, and map the driving conditions of the automobile 2 thus obtained onto the current-time road maps 61 and 62 or other maps.

The conflict predictor 54 predicts whether potential conflicts occur between the driving operations of multiple automobiles 2, by using mapping data generated by the mapper 53. Such conflicts include at least collision. Such conflicts may include a situation such as multiple automobiles 2 coming too close to each other. The conflict predictor 54 predicts which automobiles 2 will come into conflict with each other if the automobiles 2 continue to travel under the present circumstances.

The generator 55 generates driving support information to instruct or support multiple automobiles 2 to travel in such a way as to reduce potential conflict between the automobiles 2.

The generator 55 generates driving support information for multiple automobiles 2 in a manner that causes the automobiles 2 to follow traffic priority rules.

As the automobiles 2 travel in accordance with the driving support information, the automobiles 2 are basically able to travel safely and securely in a manner that may reduce the risk of at least collision and also optionally excessive approaching of the automobiles 2 relative to each other.

The transmitter 56 transmits multiple pieces of driving support information generated by the generator 55 for multiple automobiles 2, to the corresponding automobiles 2. If the generated driving support information is common to multiple automobiles 2, the transmitter 56 may transmit the driving support information to the automobiles 2 in a multicast manner.

As indicated along the vertical time axis in FIG. 4, each of the automobiles 2 repeatedly transmits vehicle information representing its driving condition or other conditions to the server apparatus 3 at relatively short intervals of time. The server apparatus 3 generates, at predetermined collection intervals, multiple pieces of driving support information based on accumulated field information, and transmits the generated driving support information to the automobiles 2. Each automobile is basically capable of receiving new driving support information at reception intervals corresponding to the collection intervals. The transmission intervals at which each automobile 2 transmits its own vehicle information may be the same as the collection intervals. Accordingly, driving support information may basically include information about a path (amount of travel) or drivable area within an infinitesimal amount of time or an infinitesimal section with respect to movement of each travelling automobile 2 for each collection interval. The drivable area may be defined as a safe area with reduced risk of collision with other automobiles. The driving support information may include information such as the speed or amount of acceleration/deceleration, or the amount of steering or direction of travel of the automobile 2 in a path within an infinitesimal amount of time or an infinitesimal section.

Each of the automobiles 2 is capable of repeatedly receiving its own driving support information from the server apparatus 3 at relatively short intervals of time. As the automobiles 2 travel in accordance with the corresponding pieces of driving support information sequentially transmitted from the server apparatus 3, the automobiles 2 are basically able to continue traveling safely and securely in a manner that may reduce the risk of at least collision and also optionally excessive approaching of the automobiles 2 relative to each other.

The server apparatus 3 thus continues to generate, for each of the automobiles 2, driving support information that helps to reduce the risk of the automobile 2 colliding with or excessively approaching another automobile. This allows the automobiles 2 to basically continue executing driving control safely and in a manner that provides a sense of security to the automobile's occupant. Each automobile 2 repeatedly acquires driving support information for each infinitesimal section in a continuous manner, and controls its driving in accordance with the acquired driving support information. This allows the automobile 2 to execute driving to travel from the current location to a desired destination safely and in a manner that provides a sense of security to the automobile's occupant.

Figure 5:
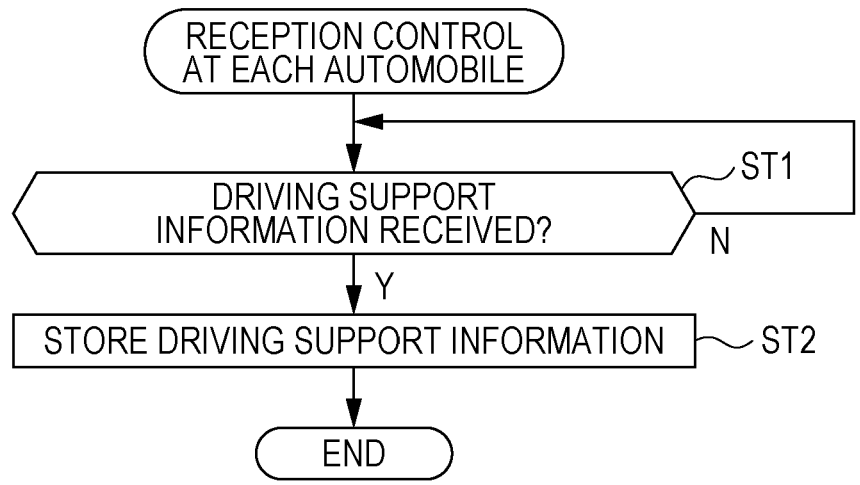
FIG. 5 is a flowchart of a reception control for receiving driving support information that is performed by the controller of each automobile illustrated in FIG. 1.

FIG. 5 is a flowchart of a reception control for receiving driving support information that is performed by the controller 20 of each automobile 2 illustrated in FIG. 1.

The controller 20 of each automobile 2 repeatedly executes the reception control illustrated in FIG. 5 by use of, for example, the AP communication unit 33.

At step ST1, the controller 20 of each automobile 2 determines whether the AP communication unit 33 has received new driving support information addressed to the automobile 2.

The AP communication unit 33 is capable of periodically receiving driving support information from the server apparatus 3.

If the AP communication unit 33 has not received new driving support information from the server apparatus 3, the controller 20 repeats the present process.

In response to the AP communication unit 33 receiving new driving support information from the server apparatus 3, the controller 20 proceeds to step ST2.

Figure 6:
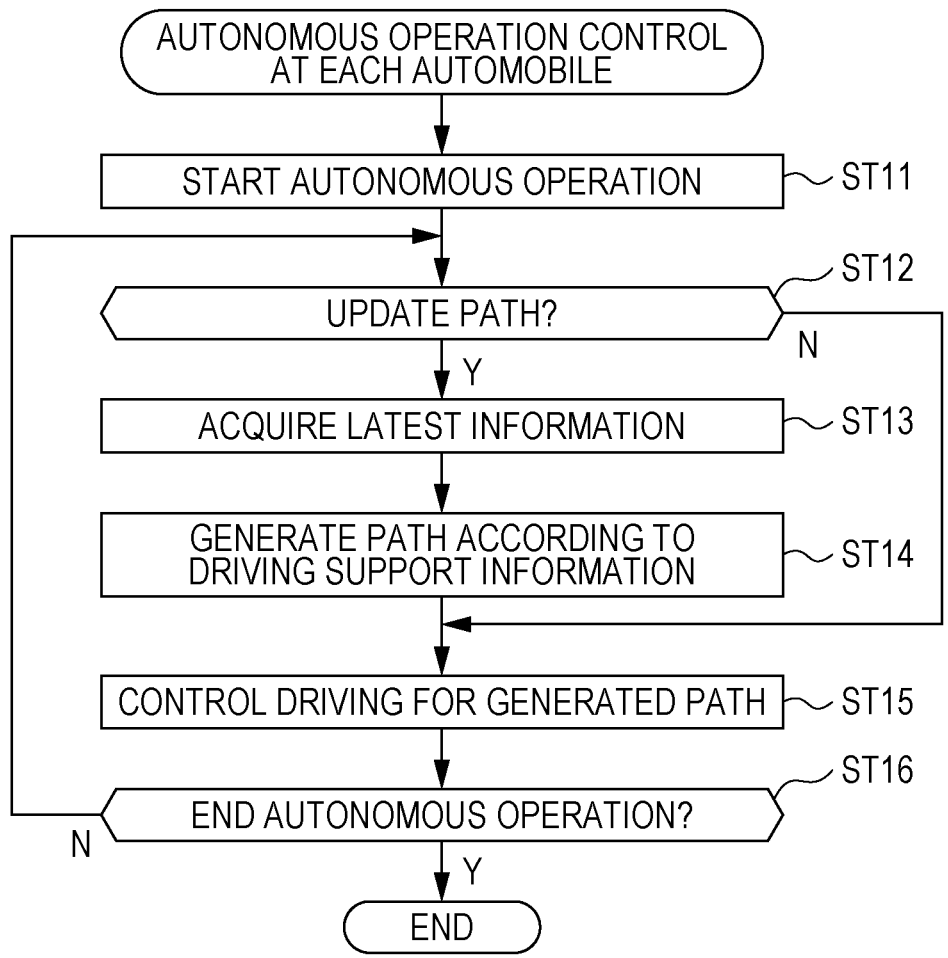
FIG. 6 is a flowchart of an autonomous operation control performed by the controller of each automobile illustrated in FIG. 1.

At step ST2, the controller 20 stores the new driving support information received from the server apparatus 3. The driving support information may be stored into, for example, the memory 14 of the computer apparatus 10 serving as the path generator 36. FIG. 6 is a flowchart of an autonomous operation control performed by the controller 20 of each automobile 2 illustrated in FIG. 1.

Autonomous operation control is an example of driving control. Other modes of driving control for the automobile 2 include assisted operation and manual operation.

The controller 20 of each automobile 2 repeatedly executes the autonomous operation control illustrated in FIG. 6 in autonomous operation mode.

The controller 20 of each automobile 2 executes driving control using driving support information during the autonomous operation control illustrated in FIG. 6.

The controller 20 may execute assisted operation control in the same manner as illustrated in FIG. 6.

At step ST11, the controller 20 starts autonomous operation control.

At step ST12, the controller 20 determines whether to update a path.

If new driving support information has been received from the server apparatus 3, the controller 20 determines to update a path, and proceeds to step ST13.

The timer 12 may repeatedly measure the path update period. In this case, the controller 20 may, every time the path update period is measured by the timer 12, determine to update a path, and proceed to step ST13.

Otherwise, the controller 20 determines not to update a path, and proceeds to step ST15.

At step ST13, the controller 20 serving as the path generator 36 acquires the latest driving support information.

At step ST14, by using the acquired driving support information, the controller 20 serving as the path generator 36 generates a path to be travelled from the current location toward a destination in accordance with the driving support information. For instance, if the acquired driving support information indicates that the current straight-moving condition is to be maintained, the controller 20 generates a path for travelling straight ahead within an infinitesimal section.

In generating a travel path as described above, the controller 20 may verify, for example, the safety of a path to be generated, based on information detected by the on-board sensors 40. The controller 20 may, if the verification determines that a certain degree of safety may not be provided, generate a path in such a way as to provide safety based on the detected information.

At step ST15, the controller 20 of each automobile 2 serving as the actual-driving controller 37 controls driving of the automobile 2 based on the latest generated path. The controller controls driving of the automobile 2 by controlling the actuation of the steering device 24, the braking device 25, and the drive device 26 in accordance with the path.

In the actual-driving control mentioned above, the controller 20 may verify, for example, the safety of a path to be travelled, based on information detected by the on-board sensors 40. The controller 20 may, if the verification determines that a certain degree of safety may not be provided, control driving of the automobile 2 such that priority is given to safety based on the detected information.

At step ST16, the controller 20 determines whether to end the autonomous operation control. If the controller 20 determines not to end the autonomous operation control, the controller 20 returns to step ST12. The controller 20 then repeats the processes from step ST12 to step ST16, and continues the autonomous operation control.

For instance, if the automobile 2 has reached and stopped at its destination, the controller 20 determines to end the autonomous operation control, and ends the present control. Likewise, in other situations such as when the driving mode of the automobile 2 has been switched from the autonomous operation mode to another mode, the controller 20 may determine to end the autonomous operation control, and end the present control.

Through such autonomous operation control, the automobile 2 is able to travel under autonomous operation such as by avoiding collision or conflict with other automobiles or such objects, or by executing driving control such as lane-keeping, following of the preceding automobile, lane-changing, or right/left turning.

This allows the automobile 2 to basically travel under stable autonomous operation from the current location to a destination while providing basic safety or sense of security.

Figure 7:
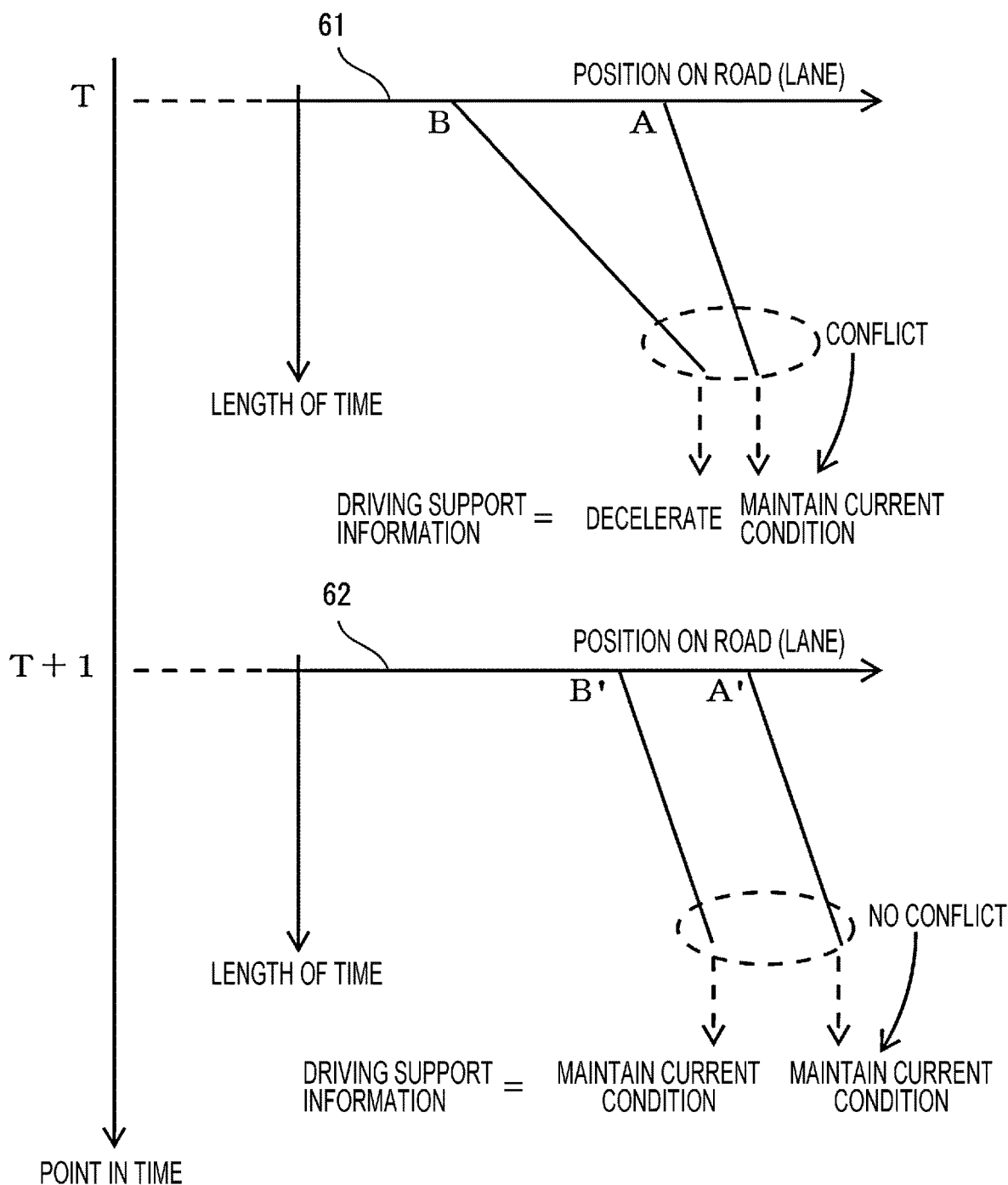
FIG. 7 illustrates exemplary mapping data generated by a mapper illustrated in FIG. 4.

FIG. 7 illustrates exemplary mapping data generated by the mapper illustrated in FIG. 4.

FIG. 7 illustrates the current-time road maps 61 and 62 repeatedly generated by the mapper for each of multiple roads (lanes).

For the current-time road maps 61 and 62 in FIG. 7, the horizontal axis represents position on a road (lane). The vertical axis represents time. In FIG. 7, time flows from top to bottom.

The current-time road map 61 in the upper part of FIG. 7 is generated at time T. The respective current positions A and B of two automobiles 2 are mapped along the horizontal axis in FIG. 7.

Further, respective predicted paths for the two automobiles 2 that extend in accordance with the respective current speeds of the two automobiles 2 are mapped.

In this case, the automobile 2 corresponding to the current position B and travelling behind the automobile 2 corresponding to the current position A travels faster than the automobile 2 corresponding to the current position A. As a result, after a predetermined amount of time, the automobile 2 initially located at the current position B will approach, from behind, the automobile 2 initially located at the current position A.

The server apparatus determines that the two automobiles 2 will come into conflict.

At this time, for the automobile 2 corresponding to the current position A, the generator 55 of the server apparatus 3 generates driving support information including an instruction to maintain the current speed. For the automobile 2 corresponding to the current position B, the generator 55 of the server apparatus 3 generates driving support information including an instruction to decelerate.

The transmitter 56 of the server apparatus 3 transmits the multiple pieces of driving support information thus generated to the corresponding automobiles 2.

The controller 20 of an automobile 2A, which corresponds to the current position A and travels in accordance with driving support information, receives driving support information addressed to the automobile 2A, and continues to execute a driving control that causes the automobile 2A to maintain the current speed.

The controller 20 of an automobile 2B, which corresponds to the current position B and travels in accordance with driving support information, receives driving support information addressed to the automobile 2B, and continues to execute a driving control that causes the automobile 2B to decelerate.

The current-time road map 62 in the lower part of FIG. 7 is generated at time T+1 that is later than time T.

In this case, the automobile 2 corresponding to the current position B' and travelling behind the automobile 2 corresponding to the current position A' travels at the same speed as the automobile 2 corresponding to the current position A'.

The server apparatus determines that the two automobiles 2 will not come into conflict.

At this time, for the automobile 2 corresponding to the current position A', the generator 55 of the server apparatus 3 generates driving support information including an instruction to maintain the current speed. For the automobile 2 corresponding to the current position B', the generator 55 of the server apparatus 3 generates driving support information including an instruction to maintain the current speed.

The transmitter 56 of the server apparatus 3 transmits the multiple pieces of newly generated driving support information to the corresponding automobiles 2.

The controller 20 of the automobile 2 corresponding to the current position A' and travelling in accordance with driving support information receives new driving support information addressed to the automobile 2 corresponding to the current position A', and continues to execute a driving control that causes the automobile 2 corresponding to the current position A' to maintain the current speed.

The controller 20 of the automobile 2 corresponding to the current position B' and travelling in accordance with driving support information receives new driving support information addressed to the automobile 2 corresponding to the current position B', and continues to execute a driving control that causes the automobile 2 corresponding to the current position B' to maintain the current speed.

As described above, multiple automobiles 2 travel in accordance with the corresponding pieces of driving support information generated based on the mapping data illustrated in FIG. 7. This allows the automobiles 2 to continue travelling under autonomous operation while providing basic safety and sense of security.

It is to be noted, however, that even if driving support information is generated as described above for each of multiple automobiles 2 based on the current-time road maps 61 and 62 generated as mapping data for each individual road (lane), this may not necessarily provide safety or sense of security, or smooth driving in every possible driving situation.

Figure 8A:
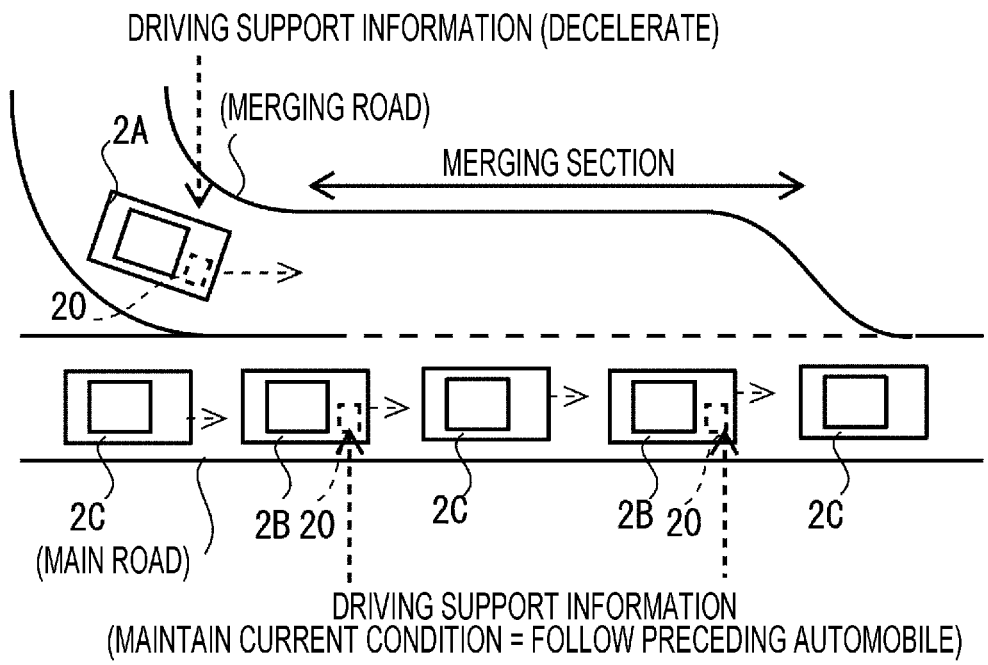
FIGS. 8A and 8B each illustrate an exemplary driving situation where a first automobile travelling on a merging road moves in a merging section so as to merge from a merging lane toward a congested or crowded lane of the main road.
Figure 8B:
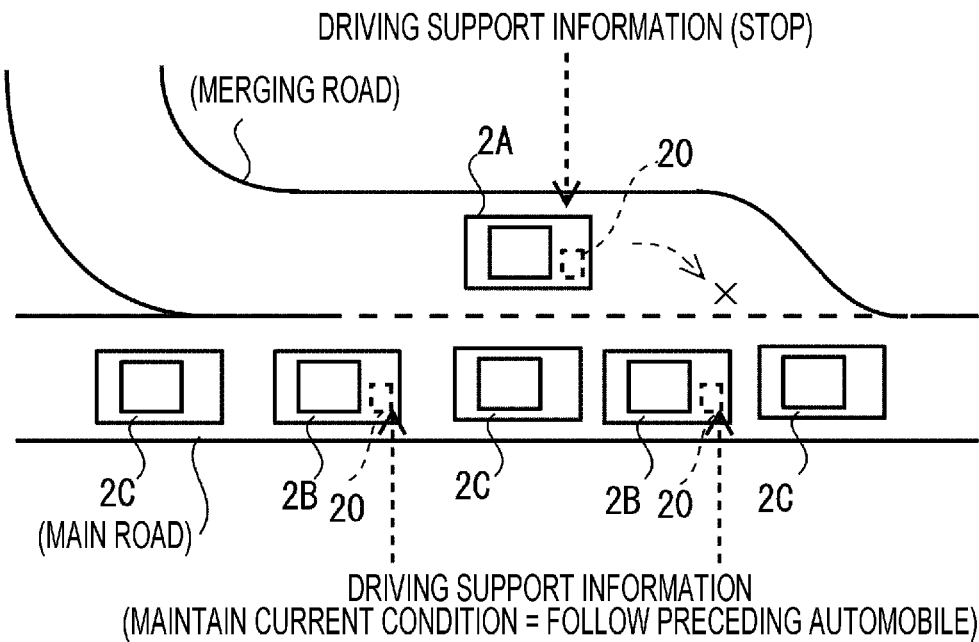

FIGS. 8A and 8B each illustrate an exemplary driving situation where a first automobile 2A travelling on a merging road moves in a merging section so as to merge from a merging lane toward a congested or crowded lane of the main road.

In FIG. 8A, multiple second automobiles 2B and multiple third automobiles 2C are travelling in a string in a lane of the main road with their speeds slowing down due to traffic congestion or crowding. Like the first automobile 2A, the second automobiles 2B are travelling under autonomous operation in accordance with driving support information in such a way as to, for example, follow their preceding automobiles. The third automobiles 2C are travelling under independent autonomous operation, assisted operation, or manual operation, independently of driving support information.

According to the traffic priority rules applicable to this driving situation, the automobiles 2 travelling on the main road have priority over the automobile 2 intending to perform a merge. In this case, the driving support information for the second automobiles 2B is basically one that instructs the second automobiles 2B to follow their preceding automobiles. At this time, the server apparatus 3 may predict that the first automobile 2A will come into conflict with the second automobiles 2B if the first automobile 2A makes a lane change. Even in such a case, the server apparatus 3 generates driving support information that gives traffic priority to the second automobiles 2B over the first automobile 2A in accordance with traffic priority rules. Consequently, the second automobiles 2B and the third automobiles 2C, which are travelling in the lane of the main road, continue to travel such that each of these automobiles follows its preceding automobile while keeping a suitable headway distance to the preceding vehicle.

As a result, the first automobile 2A travelling in the merging lane has lower traffic priority also in accordance with the driving support information. Consequently, even as the first automobile 2A travels in the merging section where a lane change into the lane of the main road is allowed, the first automobile 2A may not be given an instruction to change lanes, which may make the first automobile 2A unable to move from the merging lane toward the lane of the main road. In this case, based on an instruction included in the driving support information, the first automobile 2A travelling in the merging lane moves to the end of the merging section, and comes to a stop at the end of the merging section as illustrated in FIG. 8B.

Even after the first automobile 2A comes to a stop at the end of the merging section, unless the congestion or crowding of the lane of the main road eases, the first automobile 2A may not be able to obtain an instruction based on provided driving support information that instructs the first automobile 2A to change lanes from the current lane toward the lane of the main road. This may cause the first automobile 2A to continue stopping at that position.

As described above, for places where multiple roads merge or for places where multiple lanes merge, driving support information gives priority to traffic in the lane of the main road in accordance with traffic priority rules. Therefore, the automobile 2 on the lower priority road or lane may not be able to travel smoothly.

The same is true for places where multiple roads intersect. For such places as well, driving support information gives priority to traffic in the through lane in accordance with traffic priority rules. Therefore, the automobile 2 on a road or lane with lower priority that turns right or left may not be able to travel smoothly.

It is thus desirable for the driving support system for the automobile 2 to be able to provide, with respect to driving of the automobile 2, safety and smooth movement during a merge or other maneuver.

FIG. 9 is a timing chart of a merge control executed in the driving support system according to the first embodiment.

FIG. 9 illustrates, together with the server apparatus 3, the first automobile 2A, which is travelling on a merging road and intends to change lanes, and the second automobile 2B, which is travelling in the target lane of a road into which the first automobile 2A intends to move. In FIG. 9, time flows from top to bottom.

When the first automobile 2A travels into, for example, a merging section where a lane change is allowed on a merging road, the controller 20 of the first automobile 2A transmits a lane change request to the server apparatus 3 at step ST21. The lane change request is transmitted to the server apparatus 3 via, for example, the AP communication unit 33 of the first automobile 2A, or the base station 4.

In response to receiving the lane change request from the first automobile 2A, the CPU 15 of the server apparatus 3 executes a control for enabling the first automobile 2A to change lanes.

At step ST22, the CPU 15 first acquires the driving mode of the first automobile 2A.

At step ST23, the CPU 15 determines the driving mode of the first automobile 2A.

At step ST24, the CPU 15 acquires the size of a merging space corresponding to the determined driving mode of the first automobile 2A.

At step ST25, the CPU 15 transmits a merge notification including information about the merging space to the second automobile 2B that is traveling in the target lane into which the first automobile 2A intends to move. The merge notification is transmitted to the controller 20 of the second automobile 2B via, for example, the base station 4, or the AP communication unit 33 of the second automobile 2B.

The above-mentioned configuration allows the server apparatus 3 of the driving support system to, if there is any first automobile 2A intending to move between multiple lanes, acquire the size of a merging space that is to be provided by the second automobile 2B for the intended lane change of the first automobile 2A, and notify the second automobile 2B in the target lane of the size of the merging space.

In response to receiving the merge notification from the server apparatus 3, the controller 20 of the second automobile 2B executes a control for allowing the first automobile 2A to change lanes.

At step ST26, the controller 20 receives the merge notification from the server apparatus 3.

At step ST27, the controller 20 changes traffic priorities with respect to driving of the second automobile 2B. The second automobile 2B is travelling on the road or lane to which the first automobile 2A is attempting to move from its current lane. This means that according to the default traffic priority rules, the second automobile 2B may ignore the intended lane change of the first automobile 2A, and continue travelling on the current road or lane. To temporarily discontinue such driving behavior, the controller 20 changes traffic priorities with respect to driving of the second automobile 2B. With its priority thus changed to a lower level, the second automobile 2B now yields priority to the lane change of the first automobile 2A.

At step ST28, the controller 20 generates a path for providing the merging space included in the notification. The controller 20 basically generates a path that causes the second automobile 2B to decelerate while performing lane keeping.

At step ST29, the controller 20 executes a control that causes the second automobile 2B to travel in accordance with the generated path. The controller 20 causes the second automobile 2B to decelerate and continue travelling at the decelerated speed while performing lane keeping, until the spacing between the second automobile 2B and its preceding automobile prior to the lane change of the first automobile 2A becomes greater than or equal to the merging space included in the notification.

In this way, if there is a notification about an intended lane change of the first automobile 2A, the controller 20 of the second automobile 2B is able to execute a driving control for providing a merging space whose size has been acquired through the notification.

Then, a merging space is created in front of the second automobile 2B that is travelling in the target lane of the road. The first automobile 2A travelling in the merging section where a lane change is allowed on the merging road is thus able to execute a driving control for changing lanes toward the merging space.

The first automobile 2A travelling in the merging section where a lane change is allowed on the merging road is able to execute a driving control for changing lanes toward the merging space without coming to a stop or continuing to stop on the merging road.

Figure 10:
FIG. 10 illustrates a selection table for selecting a computing equation for computing a merging space that is to be provided for each automobile driving mode by the server apparatus of the driving support system illustrated in FIG. 1.

FIG. 10 illustrates a selection table 71 for selecting a computing equation for computing a merging space that is to be provided for each driving mode of the automobile 2 by the server apparatus 3 of the driving support system 1 illustrated in FIG. 1.

Referring to FIG. 10, different merging spaces are to be provided for different driving moves of the first automobile 2A.

Driving modes of the first automobile 2A includes autonomous operation mode, assisted operation mode, and manual operation mode. There is also an unknown mode, which is an unidentifiable driving mode.

The first automobile 2A may be able to change lanes as long as there is at least a fixed space available for providing some margin relative to the size of the first automobile 2A intending to change lanes. In manual operation mode, the driver changes lanes while visually checking available lane change space. For this reason, the size of the merging space to be provided in manual operation mode may be the above-mentioned size. The size of the automobile 2 may be a fixed size based on vehicle model or vehicle grade. The fixed space may be, for example, about five meters. As long as a merging space of such a size is available, the driver is able to safely change lanes while visually checking the available merging space.

By contrast, in autonomous operation mode or assisted operation mode, the automobiles 2 are often travelling based on driving support information generated by the driving support system 1. The driving support system 1 may not necessarily be able to keep accurate track of the latest position of each automobile 2. Accordingly, the merging space to be provided in autonomous operation mode or assisted operation mode is set to a size obtained by adding, to the above-mentioned size to be provided in manual operation, a size based on one of the following values: the speed of the first automobile 2A or the second automobile 2B; and the difference in speed between the first automobile 2A and the second automobile 2B. Accordingly, the size of the merging space to be provided in autonomous operation mode or assisted operation mode is longer than the size of the merging space to be provided in manual operation mode. This allows the first automobile 2A to safely change lanes toward a sufficiently long merging space, even in situations where it may not be possible to keep accurate track of the latest position of each second automobile 2B.

The driving support system 1 may not necessarily manage the driving of every automobile 2 travelling on a road. The automobiles 2 may be susceptible to the risk of the driving support system 1 going down or stopping. Accordingly, the selection table in FIG. 10 includes a computing equation for cases where the driving mode of each automobile 2 is unknown. The size of the merging space to be provided for a case where the driving mode is unknown is basically the same as the size of the merging space to be provided in autonomous operation mode or assisted operation mode.

As a result, if it may not be possible to determine that the first automobile 2A is travelling under manual operation during its movement between lanes, the merging space to be provided in such a case can be set to a size longer than the size of the merging space that is acquired if the first automobile 2A is travelling under autonomous operation or assisted operation. This may improve the safety of the merge.

The selection table 71 in FIG. 10 used to select a merging space may be stored in the memory 14 of the server apparatus 3 in the form of data or a program.

In such a case, at step ST24, the CPU 15 of the server apparatus 3 selects and reads, from the selection table 71 illustrated in in FIG. 10, a computing equation corresponding to a previously acquired driving mode of the first automobile 2A, and by using the read computing equation, computes a size of the merging space corresponding to the driving mode of the first automobile 2A.

The CPU 15 of the server apparatus 3 is thus able to compute a merging space in such a way as to provide a minimum necessary space corresponding to the driving mode of the first automobile 2A. This helps to reduce unnecessary disruptions to the traffic of the second automobiles 2B or other automobiles travelling in the target lane. As a result, the first automobile 2A is allowed to execute a lane change smoothly without causing unnecessary disruptions to the traffic of the automobiles 2 travelling in the target lane. This helps to achieve smooth movement.

Figure 11A:
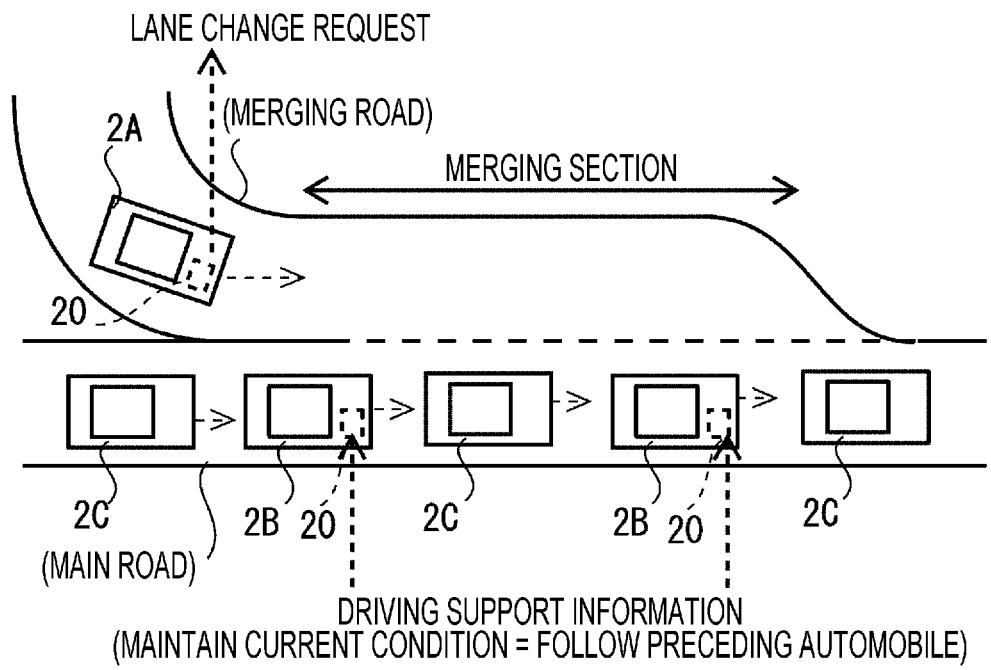
FIGS. 11A and 11B each illustrate an exemplary merge driving situation corresponding to FIGS. 8A and 8B, in accordance with the merge control illustrated in FIG. 9.
Figure 11B:
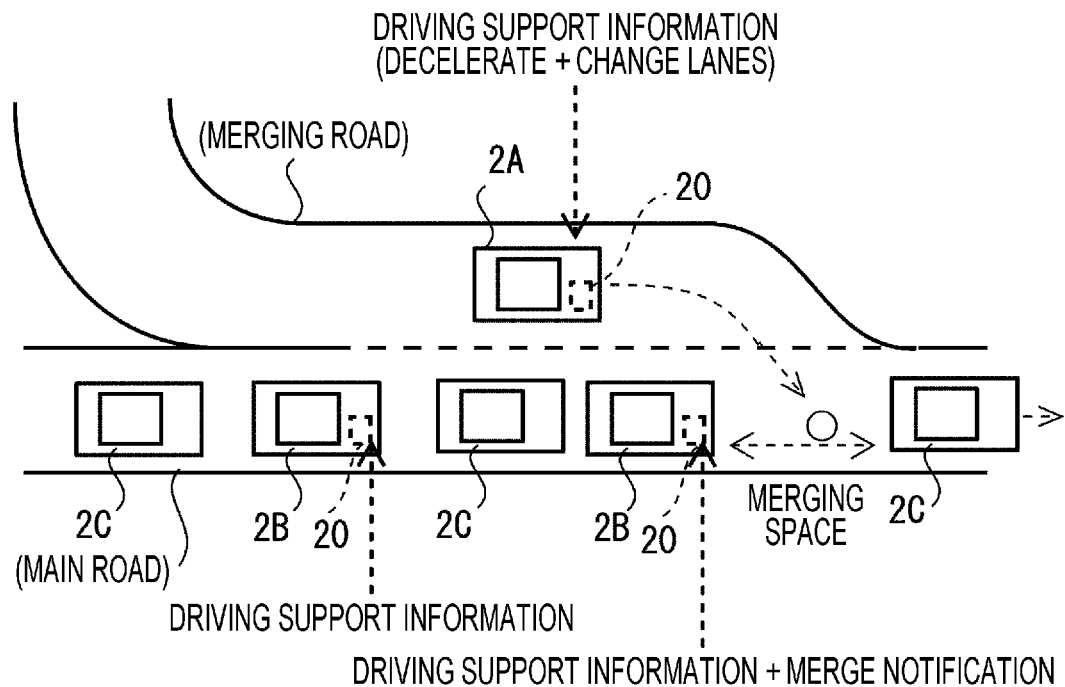

FIGS. 11A and 11B each illustrate an exemplary merge driving situation corresponding to FIGS. 8A and 8B, in accordance with the merge control illustrated in FIG. 9.

In FIG. 11A, as in FIG. 8A, multiple second automobiles 2B and multiple third automobiles 2C are travelling in a string in a lane of the main road with their speeds slowing down due to traffic congestion or crowding. Like the first automobile 2A, the second automobiles 2B are travelling under autonomous operation in accordance with driving support information in such a way as to, for example, follow their preceding automobiles. The third automobiles 2C are travelling under independent autonomous operation, assisted operation, or manual operation, independently of driving support information.

According to the traffic priority rules applicable to this driving situation, the automobiles 2 travelling on the main road have priority over the automobile 2 intending to perform a merge. In this case, the driving support information for the second automobiles 2B is basically one that instructs the second automobiles 2B to follow their preceding automobiles. At this time, the server apparatus 3 may predict that the first automobile 2A will come into conflict with the second automobiles 2B if the first automobile 2A makes a lane change. Even in such a case, the server apparatus 3 generates driving support information that gives traffic priority to the second automobiles 2B over the first automobile 2A in accordance with traffic priority rules. Consequently, the second automobiles 2B and the third automobiles 2C, which are travelling in the lane of the main road, continue to travel such that each of these automobiles follows its preceding automobile while keeping a suitable headway distance to the preceding vehicle.

Then, as illustrated in FIG. 11B, one second automobile 2B travelling on the main road receives a merge notification from the server apparatus 3. The second automobile 2B that has received the merge notification changes traffic priorities such that the second automobile 2B yields priority to the lane change that the first automobile 2A intends to perform for merging. The second automobile 2B then controls driving in such a way as to create a merging space of which the second automobile 2B has been notified. As a result, a merging space long enough to allow the intended lane change of the first automobile 2A is created between the second automobile 2B that has received the merge notification, and the third automobile 2C in front of the second automobile 2B. As a result, even though the main road is congested or crowded, the first automobile 2A is able to smoothly change lanes toward the merging space provided in front of the second automobile 2B, without stopping in the merging section. At this time, other second automobiles 2B travelling behind the second automobile 2B that has received the merge notification, and the third automobiles 2C are each travelling so as to keep a suitable headway distance to its preceding automobile.

As described above, according to the first embodiment, the server apparatus 3 of the driving support system 1 for supporting driving of the automobile 2 that travels on a road is configured to, if there is any first automobile 2A intending to move between multiple lanes, compute and acquire the size of a merging space that is to be provided by the second automobile 2B in the target lane for the intended merging of the first automobile 2A, and notify the second automobile 2B of the acquired size of the merging space. The server apparatus 3 is also configured to, if the first automobile 2A is travelling under autonomous operation or assisted operation when moving between lanes, acquire a size of the merging space that is longer than the size of the merging space that is acquired if the first automobile 2A is travelling under manual operation.

As a result, with respect to driving of the first automobile 2A intending to move between multiple lanes, and driving of the second automobile 2B that is likely to be affected by the intended lane change, the first embodiment makes it possible to achieve smooth driving while improving safety during movement of the first automobile 2A between the lanes. Therefore, the first embodiment allows the driving support system 1 to provide improved driving support for the automobile 2.

As for the first automobile 2A that travels under manual operation, the occupant of the first automobile 2A may be able to manually execute a merge maneuver as long as there is enough merging space available for the first automobile 2A to merge into. The first embodiment may reduce the possibility of an unnecessarily long merging space being created in such a case. This may reduce unnecessarily disruptions to the traffic of the automobiles 2 travelling in the target lane.

Second Embodiment

Reference is now made to the driving support system 1 for the automobile 2 according to a second embodiment of the disclosure. According to the second embodiment, in addition to notifying the second automobile 2B of an intended merge and causing the second automobile 2B to execute a merge control, the server apparatus 3 executes a control corresponding to a merge in accordance with driving support information.

In the following description of the second embodiment, features similar to those according to the first embodiment mentioned above will be denoted by the same reference signs and will not be illustrated nor described in further detail. The following description will mainly focus on differences from the first embodiment mentioned above.

Figure 12:
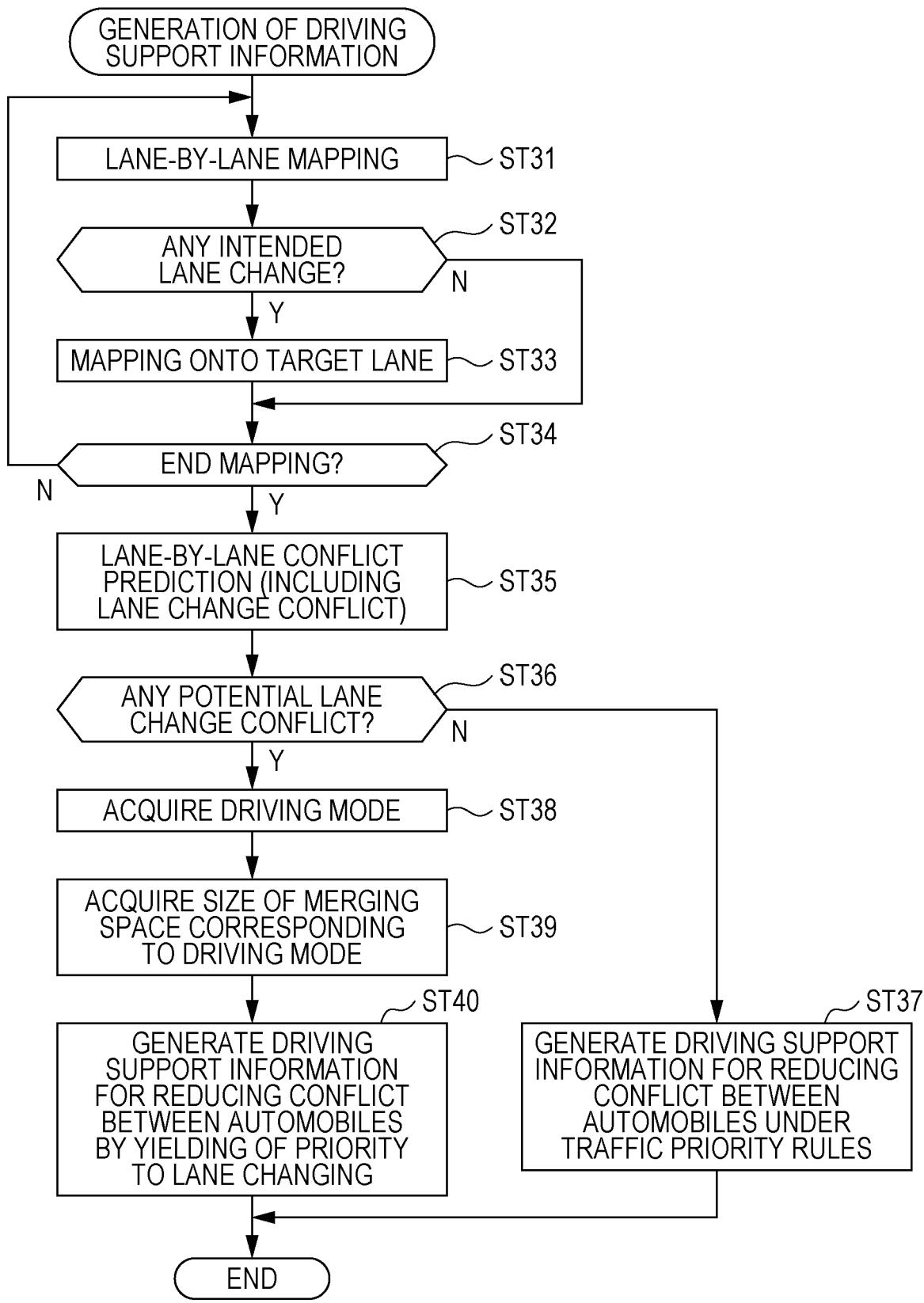
FIG. 12 is a timing chart of a control executed in a driving support system according to a embodiment to generate driving support information corresponding to a merge control.

FIG. 12 is a timing chart of a control executed in the driving support system according to the second embodiment to generate driving support information corresponding to a merge control.

The CPU 15 of the server apparatus 3 periodically repeats, by using field information collected by the accumulator 52, execution of a control illustrated in FIG. 12 to generate driving support information corresponding to a merge control.

At step ST31, the CPU 15 of the server apparatus 3, which serves as the mapper 53, maps predicted paths representing the driving conditions of multiple automobiles 2, onto maps such as the current-time road maps 61 and 62 on a road by road basis or on a lane by lane basis, by using field information accumulated in the accumulator 52.

At step ST32, the CPU 15 of the server apparatus 3 determines whether there is any automobile 2 intending to change lanes for a merge or other maneuver. If there is any automobile 2 intending to change lanes, the CPU 15 proceeds to step ST33. If there is no automobile 2 intending to change lanes, the CPU 15 proceeds to step ST34.

At step ST33, the CPU 15 of the server apparatus 3 maps, onto maps such as the current-time road maps 61 and 62 on a road by road basis or on a lane by lane basis, a predicted path that the automobile 2 intending to change lanes for a merge or other maneuver will travel after the lane change.

At step ST34, the CPU 15 of the server apparatus 3 determines whether to end mapping. If mapping has not been finished for all of the automobiles 2 to be managed, the CPU 15 returns to step ST31. In response to finishing mapping for all of the automobiles 2 to be managed, the CPU 15 proceeds to step ST35.

At step ST35, the CPU 15 of the server apparatus 3, which serves as the conflict predictor 54, predicts whether conflict will occur with respect to driving of multiple automobiles 2, by using the current-time road maps 61 and 62 generated on a road by road or lane by lane basis and onto which the automobiles 2 have been mapped. The current-time road maps 61 and 62 includes a predicted path that the automobile 2 intending to change lanes for a merge or other maneuver will travel after the lane change. Accordingly, the CPU 15 also predicts whether conflict resulting from a lane change will occur with respect to the automobile 2 intending to change lanes for a merge or other maneuver.

At step ST36, the CPU 15 of the server apparatus 3 determines whether conflict resulting from the lane change is predicted to occur, with respect to the automobile 2 intending to change lanes for a merge or other maneuver. If no conflict resulting from the lane change is predicted to occur, the CPU 15 proceeds to step ST37. If any potential conflict resulting from the lane change is predicted to occur, the CPU 15 proceeds to step ST38.

At step ST37, since no potential conflict resulting from the lane change is predicted to occur, the CPU 15 of the server apparatus 3 generates driving support information for the automobiles 2 in such a way as to reduce potential conflict between the automobiles 2 under traffic priority rules. The CPU 15 transmits the driving support information generated for each of the automobiles 2 to the corresponding automobile 2, and ends the present control.

At step ST38, since potential conflict resulting from the lane change is predicted to occur, the CPU 15 of the server apparatus 3 executes a process for reducing such potential conflict. The CPU 15 of the server apparatus 3 first acquires the driving mode of each of the automobiles 2 involved in the lane change for which conflict is predicted to occur.

At step ST39, the CPU 15 of the server apparatus 3 acquires the size of a merging space corresponding to the acquired driving mode. The CPU 15 acquires, from the selection table 71 in FIG. 10 used to select a merging space, a computing equation for computing a merging space corresponding to the acquired driving mode, and computes and acquires a length representing the size of the merging space.

At step ST40, the CPU 15 of the server apparatus 3 changes traffic priorities for the road or lane for which conflict resulting from the lane change is predicted to occur, and generates driving support information for each of the automobiles in such a way as to give priority to the lane-changing automobile 2 over the automobiles 2 travelling on the road or lane. At this time, for the automobile 2 that will be travelling behind the lane-changing automobile 2 after the lane change, the CPU 15 generates driving support information that causes the automobile 2 to create a suitably sized merging space. This may reduce potential conflict between the lane-changing automobile 2 and the automobile 2 that will be travelling behind the lane-changing automobile 2 after the lane change. For other automobiles 2, as with step ST37, the CPU 15 generates driving support information in such a way as to reduce potential conflict between the automobiles 2 under traffic priority rules. The CPU 15 transmits the driving support information generated for each of the automobiles 2 to the corresponding automobile 2, and ends the present control.

Figure 13:
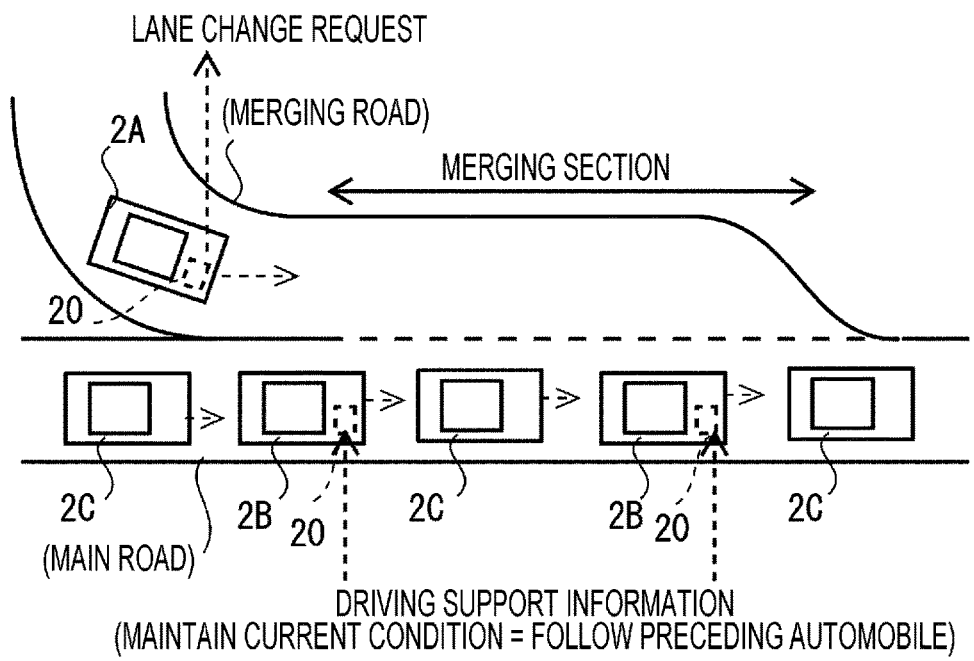
FIG. 13 illustrates an exemplary pre-merge driving situation corresponding to FIG. 8A, in accordance with the merge control illustrated in FIG. 12.

FIG. 13 illustrates an exemplary pre-merge driving situation corresponding to FIG. 8A, in accordance with the merge control illustrated in FIG. 12.

In FIG. 13, as in FIG. 8A, multiple second automobiles 2B and multiple third automobiles 2C are travelling in a string in a lane of the main road with their speeds slowing down due to traffic congestion or crowding. Like the first automobile 2A, the second automobiles 2B are travelling under autonomous operation in accordance with driving support information in such a way as to, for example, follow their preceding automobiles. The third automobiles 2C are travelling under independent autonomous operation, assisted operation, or manual operation, independently of driving support information.

According to the traffic priority rules applicable to this driving situation, the automobiles 2 travelling on the main road have priority over the automobile 2 intending to perform a merge. In this case, the driving support information for the second automobiles 2B is basically one that instructs the second automobiles 2B to follow their preceding automobiles. Consequently, the second automobiles 2B and the third automobiles 2C, which are travelling in the lane of the main road, are each travelling so as to follow its preceding automobile while keeping a suitable headway distance to the preceding vehicle.

Figure 14:
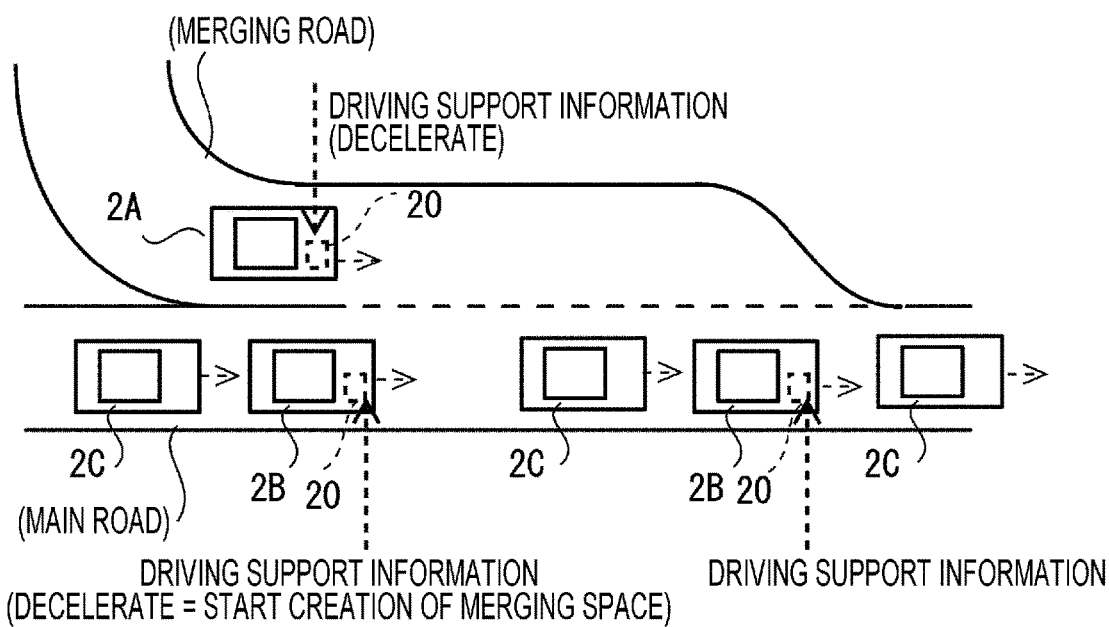
FIG. 14 illustrates an exemplary merge driving situation subsequent to the merge driving situation illustrated in FIG. 13.

FIG. 14 illustrates an exemplary merge driving situation subsequent to the merge driving situation illustrated in FIG. 13.

The CPU 15 of the server apparatus 3 predicts that if the first automobile 2A moves from its current lane of the merging road to the lane of the main road, the first automobile 2A will come into conflict with the second automobile 2B or the third automobile 2C that is travelling on the main road. The CPU 15 of the server apparatus 3 predicts that the first automobile 2A will come into conflict with the second automobile 2B if the first automobile 2A changes lanes.

In this case, the CPU 15 changes traffic priorities with respect to the second automobile 2B travelling on the main road, such that the second automobile 2B yields to the first automobile 2A intending to change lanes. Further, the CPU 15 generates, for the second automobile 2B travelling on the main road, driving support information that causes the second automobile 2B to decelerate so as to create a merging space, and transmits the generated driving support information to the second automobile 2B. If conflict resulting from the lane change is predicted to occur between the first automobile 2A and the second automobile 2B, the CPU 15 generates driving support information in such a way as to, for example, reduce the difference in speed between the two automobiles to thereby reduce such conflict. The second automobile 2B travelling on the main road thus begins to decelerate in accordance with the driving support information, and initiates a driving control for creating a merging space.

Figure 15:
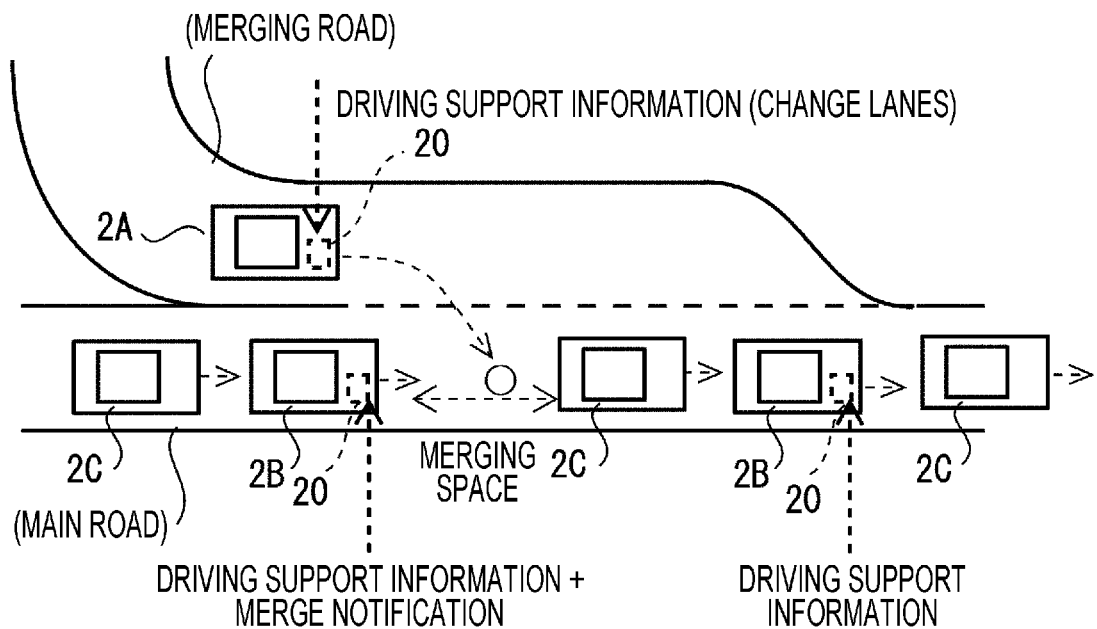
FIG. 15 illustrates an exemplary merge driving situation subsequent to the merge driving situation illustrated in FIG. 14.

FIG. 15 illustrates an exemplary merge driving situation subsequent to the merge driving situation illustrated in FIG. 14.

In FIG. 15, the CPU 15 transmits a merge notification to the second automobile 2B travelling on the main road, separately from driving support information. If the second automobile 2B has received a notification about a merge that the first automobile 2A intends to perform, the second automobile 2B changes the traffic priorities as determined by traffic priority rules such that the second automobile 2B yields to the first automobile 2A attempting to change lanes. The second automobile 2B travelling on the main road creates a merging space between the second automobile 2B and its preceding automobile to allow the intended lane change of the first automobile 2A. In this case, the second automobile 2B has already started decelerating to create the merging space. Thus allows the second automobile 2B to create the merging space through smooth changes in driving condition, without having its driving condition abruptly changed after the merge notification is provided.

The CPU 15 transmits, to the first automobile 2A travelling in the merging lane, driving support information for the first automobile 2A to change lanes. The first automobile 2A is thus able to execute a lane change maneuver so as to move into the merging space created in front of the second automobile 2B.

As a result, even though the main road is congested or crowded, the first automobile 2A is able to smoothly change lanes toward the merging space provided in front of the second automobile 2B, without stopping in the merging section. At this time, the second automobile 2B that has received the merge notification, and the third automobile 2C travelling behind the second automobile 2B are each able to smoothly change its driving so as to provide a suitable headway distance to its preceding automobile without abruptly changing its driving condition. As a result, other automobiles that will be travelling behind the first automobile 2A after the lane change of the first automobile 2A are able to continue travelling in a such a way as to maintain the flow of the automobiles 2, with reduced possibility of coming to a stop due to an abrupt change in driving condition. The presence of any automobile 2 that comes to a stop is likely to cause another congestion or crowding of the subsequent flow of the automobiles 2.

As described above, according to the second embodiment, the driving support system 1 for supporting driving of an automobile that travels on a road includes: multiple automobiles 2 each including the controller 20, the controller 20 being capable of executing driving control for autonomous operation or assisted operation of the automobile 2 during travel on the road; and the server apparatus 3 including the generator 55 configured to generate driving support information for the automobiles 2, such that the driving support information causes the automobiles 2 to basically follow traffic priority rules and to, if the automobiles 2 are predicted to come into conflict with each other due to a lane change for a merge or other maneuver, reduce such potential conflict. The server apparatus 3 transmits the driving support information generated by the generator 55 to the automobiles 2. This configuration allows the controller 20 of each of the automobiles 2 to execute driving control in accordance with the driving support information, in such a way that causes the automobiles 2 to basically follow traffic priority rules and to, if conflict between the automobiles 2 is predicted to occur, reduce such potential conflict. This may allow the automobiles 2 to achieve both the safety of their driving and smooth driving in a sophisticated manner in comparison to the first embodiment mentioned above.

Furthermore, according to the second embodiment, if the first automobile 2A intends to move between multiple lanes, the controller 20 of the second automobile 2B travelling in the target lane into which the first automobile 2A intends to move acquires driving support information for reducing conflict that is predicted to occur due to the intended lane change, and executes driving control in such a way as to reduce the difference in speed between the two automobiles to thereby reduce such potential conflict. The controller 20 of the second automobile 2B is further configured to, in response to receiving a notification from a notifier, change the traffic priorities determined by traffic rules, and execute driving control for providing a suitably sized merging space such that traffic priority is given to the first automobile 2A intending to change lanes. Consequently, for instance, if there is potential conflict between the lane-changing first automobile 2A and the second automobile 2B, in order to reduce such potential conflict, the second automobile 2B that has been travelling under autonomous operation or assisted operation is able to provide, in accordance with the driving condition of the first automobile 2A, a suitable merging space that is to be created when the first automobile 2A actually attempts to perform a merge.

As a result, with respect to driving of the first automobile 2A intending to move between multiple lanes, and driving of the second automobile 2B that is likely to be affected by the intended lane change, the second embodiment makes it possible to achieve smooth driving while improving safety during movement of the first automobile 2A between the lanes. Notably, the driving control for the second automobile 2B changes from a state in which the second automobile 2B is travelling so as to reduce potential conflict with the first automobile 2A in advance, to a state in which the second automobile 2B creates a merging space. Accordingly, in comparison to a case where the driving control changes abruptly in response to a notification from a state in which the second automobile 2B is travelling in accordance with traffic priority rules, to a state in which the second automobile 2B creates a merging space, driving of the automobile 2B is allowed to change adaptively in stages to accommodate the merging of the first automobile 2A, which leads to smoother driving. Further, at this time, the second automobile 2B has been executing a control adapted to the merge before the actual lane change of the first automobile 2A. This may reduce risks such as the second automobile 2B suddenly closing in on the first automobile 2A after the first automobile 2A completes the merge. Further, the above-mentioned configuration may conceivably lead to increased opportunities for the first automobile 2A to be able to change lanes to merge into another lane.

Third Embodiment

Reference is now made to the driving support system 1 for the automobile 2 according to a third embodiment of the disclosure.

According to the third embodiment, the automobiles 2 corresponding to the driving support system 1 directly communicate with each other during a merge through V2V communication to thereby execute a merge control.

In the following description of the third embodiment, features similar to those according to the first and second embodiments mentioned above will be denoted by the same reference signs and will not be illustrated nor described in further detail. The following description will mainly focus on differences from the first and second embodiments mentioned above.

Figure 16:
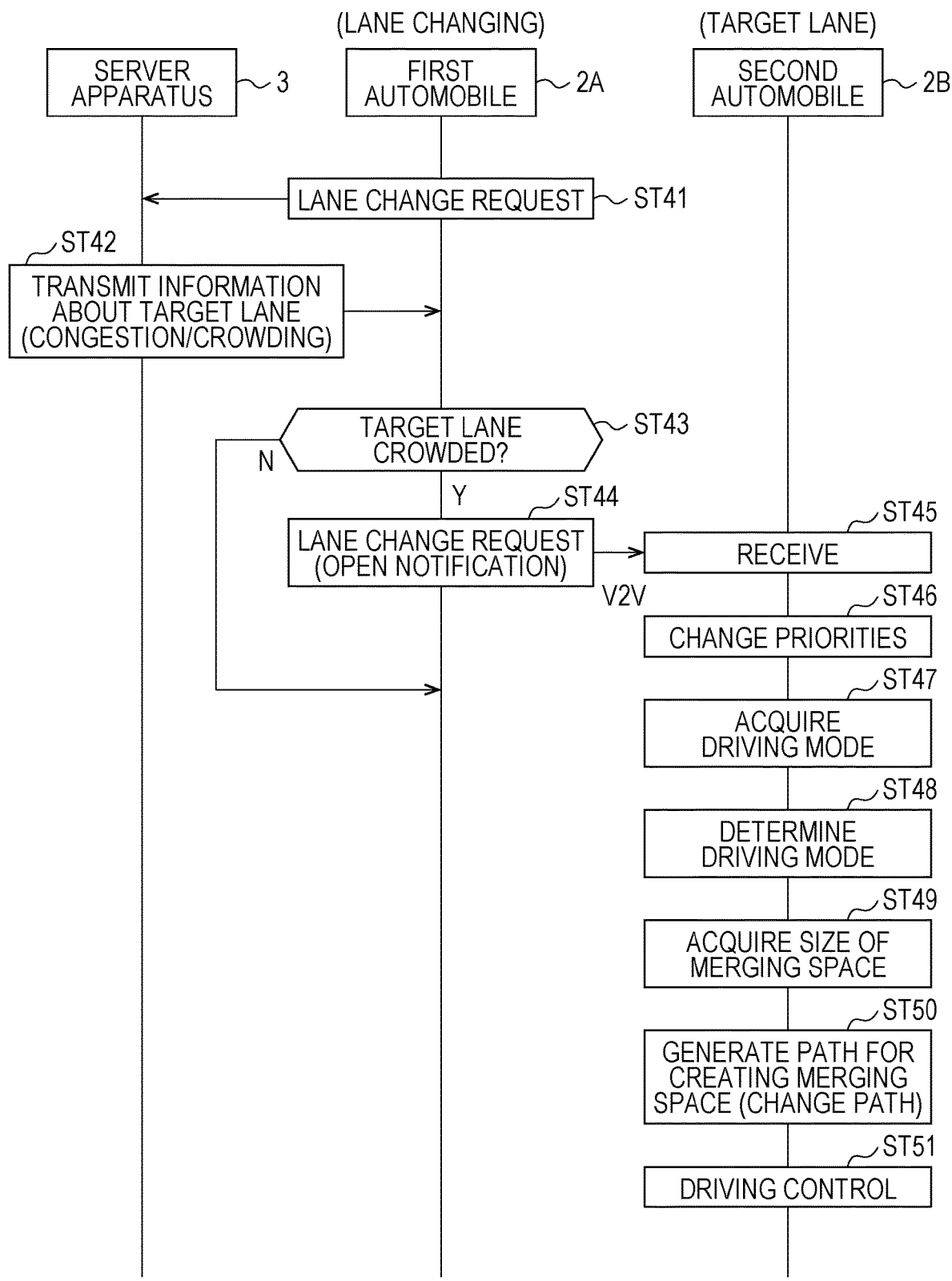
FIG. 16 is a timing chart of a merge control executed in a driving support system according to a third embodiment.

FIG. 16 is a timing chart of a merge control executed in the driving support system according to the third embodiment.

FIG. 16 illustrates, together with the server apparatus 3, the first automobile 2A, which is travelling on a merging road and intends to change lanes, and the second automobile 2B, which is travelling in the target lane of a road into which the first automobile 2A intends to move. In FIG. 16, time flows from top to bottom.

When the first automobile 2A travels into, for example, a merging section where a lane change is allowed on a merging road, the controller 20 of the first automobile 2A transmits a lane change request to the server apparatus 3 at step ST41. The lane change request is transmitted to the server apparatus 3 via, for example, the AP communication unit 33 of the first automobile 2A, or the base station 4.

At step ST42, in response to receiving the lane change request from the first automobile 2A, the CPU 15 of the server apparatus 3 transmits, to the first automobile 2A that has transmitted the lane change request, information about the degree of congestion or crowding of the target lane into which the first automobile 2A intends to move. The CPU 15 may generate information about the degree of congestion or crowding of the target lane based on, for example, road-by-road or lane-by-lane mapping data.

At step ST43, the controller 20 of the first automobile 2A determines, based on the received information about the congestion or crowding of the target lane, whether the target lane is congested or crowded to an extent that will adversely affect smooth lane changing. If the controller 20 of the first automobile 2A determines that the target lane is congested or crowded, the controller 20 proceeds to step ST44. If the controller 20 of the first automobile 2A determines that the target lane is not congested or crowded, the controller 20 skips step ST44.

At step ST44, when, for example, the timing for the first automobile 2A to enter the merging section of the merging road to change lanes is reached, the controller 20 of the first automobile 2A transmits a lane change request to the surroundings through V2V communication using the V2X communication unit 35. At this time, the controller 20 of the first automobile 2A transmits the lane change request in the form of an open notification with no specified destination. Such open notification is broadcast to the surroundings of the first automobile 2A, and can be received by the V2X communication units 35 of other automobiles in the surroundings of the first automobile 2A.

At step ST45, the V2X communication unit 35 of the second automobile 2B located near the first automobile 2A receives the lane change request that has been broadcast. The V2X communication unit 35 of the second automobile 2B receives an open merge notification from the first automobile 2A.

In this way, each of the lane-changing first automobile 2A, and the second automobile 2B moving in the target lane is able to transmit or receive a lane change request therebetween by using the V2X communication unit 35.

The V2X communication unit 35 of the lane-changing first automobile 2A is capable of, if it is determined based on information from the server apparatus 3 that the target lane is congested or crowded, directly transmitting an open lane change request with no specified destination to other automobiles travelling in the target lane, before the first automobile 2A executes the lane change. The V2X communication unit 35 of the second automobile 2B is capable of receiving the notification from the first automobile 2A.

At step ST46, in response to receiving the lane change request, the controller 20 of the second automobile 2B changes traffic priorities with respect to driving of the second automobile 2B. At this time, the second automobile 2B is travelling on the road or lane to which the first automobile 2A is attempting to move from its current lane. This means that according to the default traffic priority rules, the second automobile 2B may ignore the intention of the first automobile 2A to change lanes, and may continue travelling on the current road or lane. To temporarily discontinue such driving behavior, the controller 20 changes traffic priorities with respect to driving of the second automobile 2B. With its priority thus changed to a lower level, the second automobile 2B now yields priority to the lane change of the first automobile 2A.

At step ST47, the controller 20 of the second automobile 2B acquires the driving mode of the first automobile 2A. Information about the driving mode of the first automobile 2A may be included in the lane change request that has been broadcast.

At step ST48, the controller 20 of the second automobile 2B determines the driving mode of the first automobile 2A.

At step ST49, the controller 20 of the second automobile 2B acquires the size of a merging space corresponding to the determined driving mode of the first automobile 2A. The broadcast lane change request may include not information about the driving mode of the first automobile 2A but information about the size of the merging space determined in accordance with the driving mode of the first automobile 2A. In this case, the controller 20 of the second automobile 2B may acquire, from the lane change request, the size of the merging space corresponding to the driving mode of the first automobile 2A.

As a result, the controller 20 of the second automobile 2B is able to compute and acquire the size of the merging space that is to be provided by the second automobile 2B for the lane change of the first automobile 2A.

The controller 20 of the second automobile 2B may be configured to, if the first automobile 2A is travelling under autonomous operation or assisted operation when moving between lanes, acquire a size of the merging space that is longer than the size of the merging space that is acquired if the first automobile 2A is travelling under manual operation.

At step ST50, the controller 20 of the second automobile 2B generates a path for providing a merging space having the acquired size. The controller 20 basically generates a path that causes the second automobile 2B to decelerate while performing lane keeping.

At step ST51, the controller 20 of the second automobile 2B executes a control that causes the second automobile 2B to travel in accordance with the generated path. The controller 20 causes the second automobile 2B to decelerate and continue travelling at the decelerated speed while performing lane keeping, until the spacing between the second automobile 2B and its preceding automobile prior to the lane change of the first automobile 2A becomes greater than or equal to the acquired size of the merging space. At this time, if the controller 20 of the second automobile 2B has received a notification, the controller 20 executes driving control for autonomous operation or assisted operation to provide a merging space having the acquired size.

In this way, the controller 20 of the second automobile 2B is able to, in response to receiving the notification about the intended lane change of the first automobile 2A, execute a driving control for providing a merging space having the acquired size, independently of driving support information.

The controller 20 of the second automobile 2B travelling in the target lane is able to, in response to the V2X communication unit 35 of the second automobile 2B receiving a lane change request from the first automobile 2A in the form of an open request with no specified destination, execute a driving control for providing a merging space having the acquired size.

A merging space is thus created in front of the second automobile 2B that is travelling in the target lane of a road.

For instance, the first automobile 2A travelling in a merging section where a lane change is allowed on a merging road is thus able to execute a driving control for changing lanes toward the merging space.

The first automobile 2A travelling in the merging section where a lane change is allowed on the merging road is able to execute a driving control for changing lanes toward the merging space after moving to the end of the merging section, without coming to a stop or continuing to stop on the merging road.

Figure 17A:
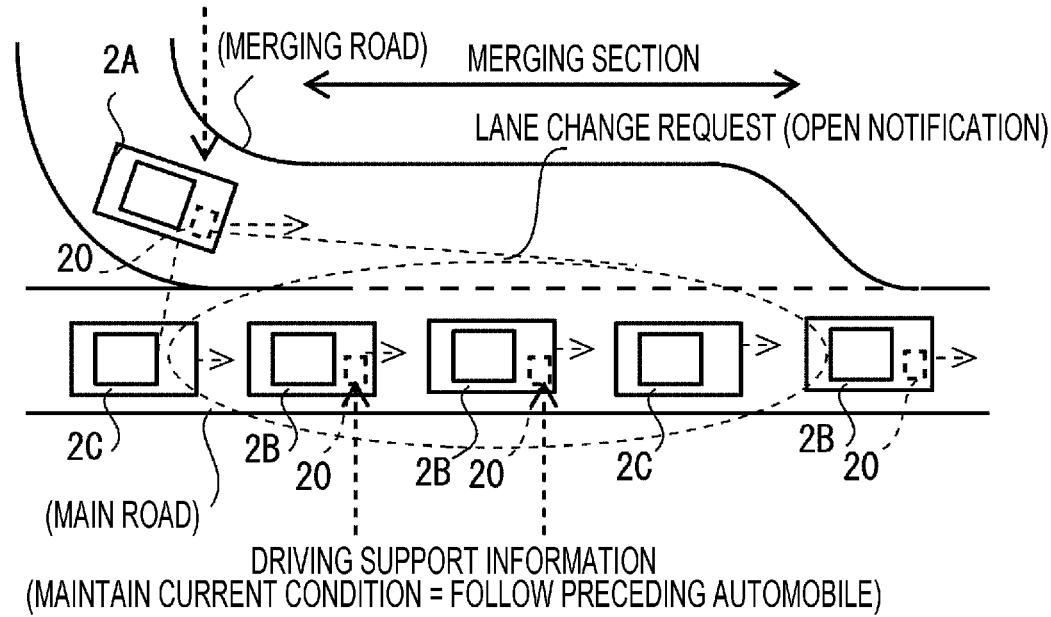
FIGS. 17A and 17B each illustrate an exemplary merge driving situation corresponding to FIGS. 8A and 8B, in accordance with the merge control illustrated in FIG. 16.
Figure 17B:
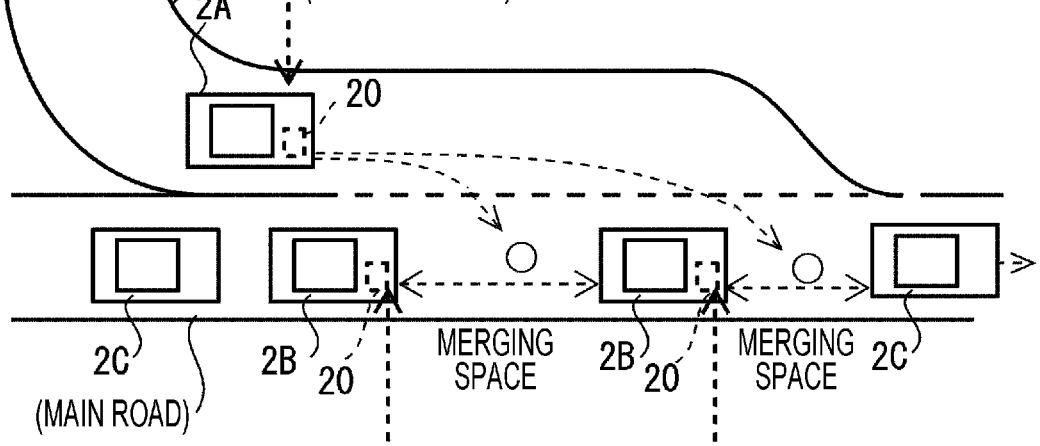

FIGS. 17A and 17B each illustrate an exemplary merge driving situation corresponding to FIGS. 8A and 8B, in accordance with the merge control illustrated in FIG. 16.

In FIG. 17A, as in FIG. 8A, multiple second automobiles 2B and multiple third automobiles 2C are travelling in a string in a lane of the main road with their speeds slowing down due to traffic congestion or crowding. Like the first automobile 2A, the second automobiles 2B are travelling under autonomous operation in accordance with driving support information in such a way as to, for example, follow their preceding automobiles.

The third automobiles 2C are travelling under independent autonomous operation, assisted operation, or manual operation, independently of driving support information.

According to the traffic priority rules applicable to this driving situation, the automobiles 2 travelling on the main road have priority over the automobile 2 intending to perform a merge. In this case, the driving support information for the second automobiles 2B is basically one that instructs the second automobiles 2B to follow their preceding automobiles. Consequently, the second automobiles 2B and the third automobiles 2C, which are travelling in the lane of the main road, are each travelling so as to follow its preceding automobile while keeping a suitable headway distance to the preceding vehicle.

In FIG. 17B, the first automobile 2A, which intends to change lanes, transmits a lane change request to the second automobile 2B travelling on the main road. The second automobile 2B receives driving support information from the server apparatus 3, and also receives a notification about the intended merge from the first automobile 2A. In this case, the second automobile 2B changes the traffic priorities determined by traffic priority rules such that the second automobile 2B yields to the first automobile 2A attempting to change lanes. The second automobile 2B travelling on the main road creates a merging space between the second automobile 2B and its preceding automobile to allow the intended lane change of the first automobile 2A. At this time, the second automobile 2B may, prior to receiving a merge notification, start decelerating to create the merging space.

The server apparatus 3 transmits, to the first automobile 2A travelling in the merging lane, driving support information for the first automobile 2A to change lanes. The first automobile 2A is able to, in response to receiving the driving support information or by its own judgement based on the on-board sensors 40, execute a lane change maneuver so as to move into the merging space created in front of the second automobile 2B.

As a result, even though the main road is congested or crowded, the first automobile 2A is able to smoothly change lanes toward the merging space provided in front of the second automobile 2B, without stopping in the merging section. At this time, the second automobile 2B that has received the merge notification is able to, in response to the first automobile 2A actually approaching the second automobile 2B and transmitting a lane change request for a merge, create the merging space immediately after receiving the lane change request. Each of the second automobiles 2B travelling on the main road can be configured to create a merging space on the condition that the first automobile 2A has approached within the effective communication range for V2V communication, and configured to, if the first automobile 2A is farther away, not unnecessarily create a merging space into which the first automobile 2A may not be able to move.

In FIG. 17B, multiple second automobiles 2B exist within the effective communication range for V2V communication mentioned above, and each of the second automobiles 2B is executing a control for creating a merging space. Multiple merging spaces are thus created on the main road. In this case, the first automobile 2A may select one of the created merging spaces, and change lanes toward the selected merging space.

If the first automobile 2A is travelling under autonomous operation or assisted operation, the first automobile 2A may basically select the nearest merging space or the longest merging space at the time of selecting a suitable merging space. This may increase the likelihood that the first automobile 2A travelling under autonomous operation or assisted operation is able to move into the merging space, which in turn may reduce the likelihood that the first automobile 2A stops or continues to stop in the merging section.

By contrast, if the first automobile 2A is travelling under manual operation, the driver of the first automobile 2A may select the merging space that is located most forward within the merging section. This allows the first automobile 2A travelling under manual operation to select a merging space that allows the first automobile 2A to efficiently pass through the merging section in the shortest possible time.

As described above, according to the third embodiment, the driving support system 1 for supporting driving of an automobile that travels on a road includes: multiple automobiles 2 each including the controller 20, the controller 20 being capable of executing driving control for autonomous operation or assisted operation of the automobile 2 during travel on the road; and the server apparatus 3 including the generator 55 configured to generate driving support information for the automobiles 2, such that the driving support information causes the automobiles 2 to basically follow traffic priority rules. The driving support information generated by the generator 55 of the server apparatus 3 is transmitted to the automobiles 2. The controller 20 of each of the automobiles 2 is thus capable of executing driving control in accordance with the driving support information in such a way that causes the automobiles 2 to follow traffic priority rules. This allows the automobiles 2 to basically achieve smooth driving while improving the safety of their driving.

Furthermore, according to the third embodiment, the congestion or crowding of the target lane into which the first automobile 2A intends to move is determined, and the lane-changing first automobile 2A, and each second automobile 2B travelling in the target lane transmit or receive a lane change request therebetween. If the target lane is determined to be congested or crowded, the first automobile 2A intending to change lanes transmits a lane change request notification in the form of an open request with no specified destination. In response to receiving the open request with no specified destination from the first automobile 2A, the second automobile 2B travelling in the target lane executes a driving control for creating a merging space.

In this way, the second automobile 2B travelling in the congested or crowded target lane executes a driving control for creating a merging space, in response to the first automobile 2A actually attempting a lane change in the vicinity of the second automobile 2B and transmitting an open notification with no specified destination. If the first automobile 2A is not actually attempting a lane change in the vicinity of the second automobile 2B, the second automobile 2B travelling in the target lane does not execute a driving control for creating a suitably sized merging space, and continues to travel in the current state. The configuration mentioned above may prevent or reduce creation, in a congested or crowed lane, of an unnecessary merging space into which the first automobile 2A may not be actually able to merge.

Furthermore, if there are multiple second automobiles 2B in the vicinity of the first automobile 2A intending to change lanes, each of the second automobiles 2B executes a driving control for creating a merging space. The first automobile 2A is thus able to, for example, select a desirable merging space in accordance with the driving mode of the first automobile 2A, and change lanes. For instance, if the first automobile 2A is travelling under manual operation, the first automobile 2A may select the most forwardly located one of multiple merging spaces. In other cases such as when the first automobile 2A is traveling under autonomous operation or assisted operation, the first automobile 2A may select the nearest merging space or the longest merging space at the time of determining which merging space to merge into.

Although exemplary embodiments of the disclosure have been described above, these embodiments are not intended to be limiting of the disclosure but may allow for various modifications or changes without departing from the scope of the disclosure.

The foregoing exemplary embodiments are directed to a case where the first automobile 2A moves from its current lane of a merging road into another lane of the main road.

In other conceivable situations, the first automobile 2A moves into an adjacent lane on the current road. In such a case as well, the server apparatus 3 or the first automobile 2A of the driving support system 1 may transmit, for example, an open notification with no specified destination to the second automobile 2B travelling in the target lane into which the first automobile 2A intends to move.

Figure 18A:
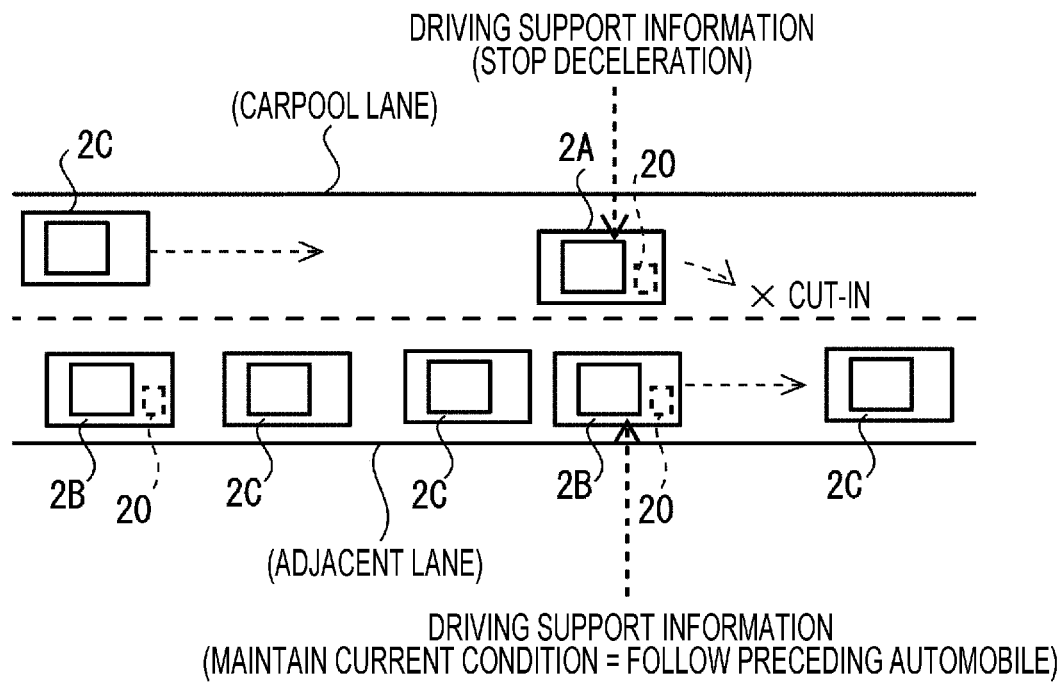
FIGS. 18A and 18B each illustrate an exemplary driving situation where an automobile moves from a carpool lane of a multi-lane road toward a congested or crowded adjacent lane.
Figure 18B:
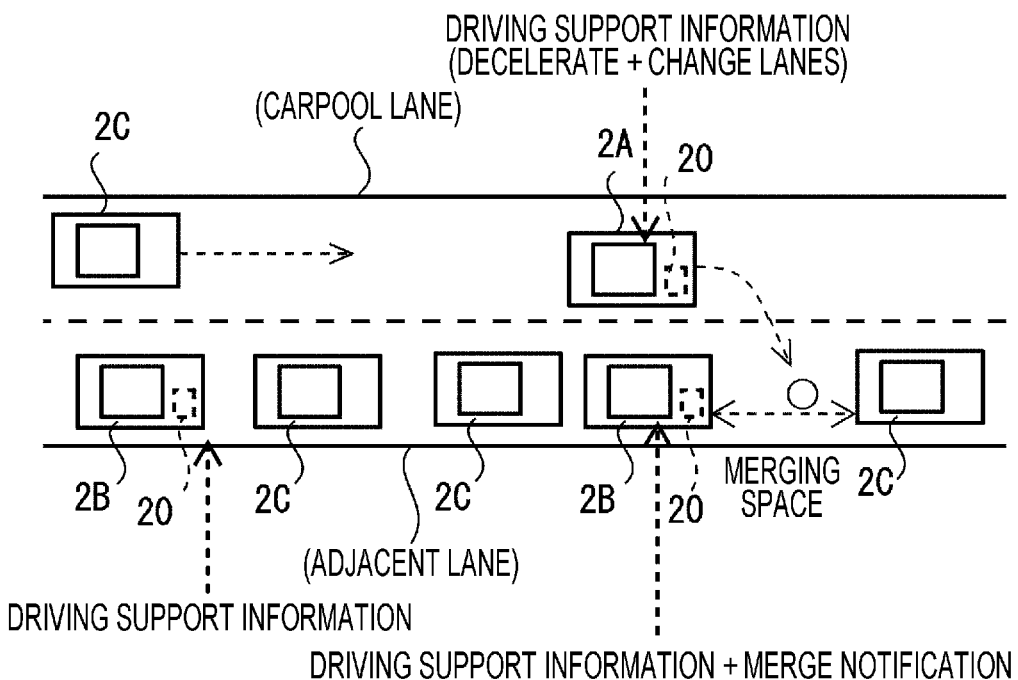

FIGS. 18A and 18B each illustrate (as another exemplary driving situation where an automobile may become unable to change lanes as in the case of FIGS. 8A and 8B) an exemplary driving situation where an automobile moves from a carpool lane of a multi-lane road toward a congested or crowded adjacent lane.

In FIG. 18A, the first automobile 2A is travelling in the carpool lane of the multi-lane road and, for example, intends to change lanes so as to cut into a congested adjacent lane to get off the road. However, lanes other than the carpool lane are congested or crowded with multiple automobiles 2. The second automobiles 2B and the third automobiles 2C are travelling in the congested adjacent lane in accordance with traffic priority rules so as to follow their preceding automobiles. As a result, even if the first automobile 2A travelling in the carpool lane attempts to move into the adjacent lane, the first automobile 2A may not be able to execute the lane change, and may come to a stop in the carpool lane. This causes other automobiles trailing the first automobile 2A to become congested in the carpool lane until the lane change of the first automobile 2A is executed.

In FIG. 18B, the second automobile 2B in the adjacent lane receives a merge notification from the server apparatus 3 or the first automobile 2A. The second automobile 2B that has received the merge notification changes traffic priorities such that the second automobile 2B yields priority to the intended lane change of the first automobile 2A, and executes a driving control for creating a merging space.

As a result, the first automobile 2A travelling in the carpool lane is able to change lanes toward the merging space created in front of the second automobile 2B. This allows the first automobile 2A travelling in the carpool lane to move into the adjacent lane without stopping in the carpool lane for a long time. This may reduce potential congestion occurring behind the first automobile 2A in the carpool lane.

As described above, the embodiments make it possible to achieve smooth overall flow of traffic while providing safety and a sense of security with respect to driving of multiple automobiles 2, which may be otherwise difficult to achieve even for cases where driving support information is generated for multiple automobiles 2 that causes the automobiles 2 to travel in accordance with traffic priority rules.

The controller 20 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 20 including the sensor controller 31, the vehicle information generator 32, the path generator 36, and the actual-driving controller 37. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle driving support system for supporting driving of a vehicle that travels on a road, the vehicle driving support system comprising:
a notifier configured to, in response to a request from a first vehicle that attempts to move between lanes, provide notification of presence of the first vehicle to a second vehicle travelling in a target lane into which the first vehicle is to move; and
an acquirer configured to acquire a size of a merging space that is to be provided by the second vehicle for merging of the first vehicle, wherein;
the acquirer is configured to, in a case where the first vehicle is travelling under autonomous operation or assisted operation, acquire the size of the merging space such that the size of the merging space is longer than when acquired in a case where the first vehicle is travelling under manual operation, and
the notifier is configured to provide the notification to the second vehicle travelling in the target lane in one or both of two cases, the two cases comprising:
a first case in which the first vehicle is to move from a lane of a merging road to a lane of a main road; and
a second case in which the first vehicle is to move to an adjacent lane of a road on which the first vehicle is currently travelling.

2. The vehicle driving support system according to claim 1, further comprising:
a generator configured to generate driving support information for the first and second vehicles,
wherein each of the first and second vehicles includes a controller configured to executed driving control for autonomous operation or assisted operation during travel on a road; and
wherein the driving support information generated by the generator is transmitted to the first and second vehicles to enable the controller of each of the first and second vehicles to execute driving control according to the driving support information,
wherein the controller of the second vehicle is configured to execute driving control by using the driving support information, and
wherein the controller of the second vehicle is configured to, in response to the notification provided from the notifier, execute driving control to create the merging space having the size acquired by the acquirer.

3. The vehicle driving support system according to claim 2,
wherein the generator generates the driving support information for the first and second vehicles such that the driving support information causes the first and second vehicles to follow traffic priority rules, and
wherein the controller of the second vehicle is configured to, in response to the notification provided from the notifier, execute driving control to create the merging space having the size acquired by the acquirer, independently of the driving support information.

4. The vehicle driving support system according to claim 3,
wherein the acquirer is configured to,
in the case where the first vehicle is travelling under manual operation, acquire the size of the merging space based on at least a size of the first vehicle, and
in the case where the first vehicle is travelling under autonomous operation or assisted operation, acquire the size of the merging space based on at least the size of the first vehicle, and a speed of the first vehicle or on a difference in speed between the first vehicle and the second vehicle.

5. The vehicle driving support system according to claim 3,
wherein the acquirer is configured to,
determine whether the first vehicle is travelling under manual operation, and
in a case where the acquirer is unable to determine that the first vehicle is travelling under manual operation, regard the first vehicle as travelling under autonomous operation or assisted operation, and acquire the size of the merging space such that the size of the merging space is longer than when acquired in the case where the first vehicle is travelling under manual operation.

6. The vehicle driving support system according to claim 2,
wherein the first vehicle and the second vehicle each comprise a communicator configured to perform communication to transmit or receive a request between the first vehicle and the second vehicle,
wherein the communicator of the first vehicle is configured to transmit, as the notification provided by the notifier, an open request with no specified destination to a vehicle travelling in the target lane, and
wherein the controller of the second vehicle travelling in the target lane is configured to, in response to the communicator of the second vehicle receiving the open request from the first vehicle, execute driving control to create the merging space having the size acquired by the acquirer.

7. The vehicle driving support system according to claim 6,
wherein the acquirer is configured to,
in the case where the first vehicle is travelling under manual operation, acquire the size of the merging space based on at least a size of the first vehicle, and
in the case where the first vehicle is travelling under autonomous operation or assisted operation, acquire the size of the merging space based on at least the size of the first vehicle, and a speed of the first vehicle or on a difference in speed between the first vehicle and the second vehicle.

8. The vehicle driving support system according to claim 6,
wherein the acquirer is configured to,
determine whether the first vehicle is travelling under manual operation, and
in a case where the acquirer is unable to determine that the first vehicle is travelling under manual operation, regard the first vehicle as travelling under autonomous operation or assisted operation, and acquire the size of the merging space such that the size of the merging space is longer than when acquired in the case where the first vehicle is travelling under manual operation.

9. The vehicle driving support system according to claim 2,
wherein the acquirer is configured to,
in the case where the first vehicle is travelling under manual operation, acquire the size of the merging space based on at least a size of the first vehicle, and
in the case where the first vehicle is travelling under autonomous operation or assisted operation, acquire the size of the merging space based on at least the size of the first vehicle, and a speed of the first vehicle or on a difference in speed between the first vehicle and the second vehicle.

10. The vehicle driving support system according to claim 2,
wherein the acquirer is configured to,
determine whether the first vehicle is travelling under manual operation, and
in a case where the acquirer is unable to determine that the first vehicle is travelling under manual operation, regard the first vehicle as travelling under autonomous operation or assisted operation, and acquire the size of the merging space such that the size of the merging space is longer than when acquired in the case where the first vehicle is travelling under manual operation.

11. The vehicle driving support system according to claim 1,
wherein the acquirer is configured to,
in the case where the first vehicle is travelling under manual operation, acquire the size of the merging space based on at least a size of the first vehicle, and
in the case where the first vehicle is travelling under autonomous operation or assisted operation, acquire the size of the merging space based on at least the size of the first vehicle, and a speed of the first vehicle or on a difference in speed between the first vehicle and the second vehicle.

12. The vehicle driving support system according to claim 1,
wherein the acquirer is configured to,
determine whether the first vehicle is travelling under manual operation, and
in a case where the acquirer is unable to determine that the first vehicle is travelling under manual operation, regard the first vehicle as travelling under autonomous operation or assisted operation, and acquire the size of the merging space such that the size of the merging space is longer than when acquired in the case where the first vehicle is travelling under manual operation.

13. A server apparatus for a vehicle driving support system, the vehicle driving support system for supporting driving of a vehicle that travels on a road, the vehicle driving support system including;
  a notifier configured to, in response to a request from a first vehicle that attempts to move between lanes, provide notification of presence of the first vehicle directly or via the first vehicle to a second vehicle travelling in a target lane into which the first vehicle is to move, and
  an acquirer configured to acquire a size of a merging space that is to be provided by the second vehicle for merging of the first vehicle, the server apparatus comprising at least the notifier, wherein:
the acquirer is configured to, in a case where the first vehicle is travelling under autonomous operation or assisted operation, acquire the size of the merging space such that the size of the merging space is longer than when acquired in a case where the first vehicle is travelling under manual operation, and
the notifier is configured to provide the notification to the second vehicle travelling in the target lane in one or both of two cases, the two cases comprising:
  a first case in which the first vehicle is to move from a lane of a merging road to a lane of a main road; and
  a second case in which the first vehicle is to move to an adjacent lane of a road on which the first vehicle is currently travelling.

14. A vehicle for a vehicle driving support system, the vehicle driving support system for supporting driving of a vehicle that travels on a road,
the vehicle driving support system including;
  a notifier configured to, in response to a request from a first vehicle that attempts to move between lanes, provide notification of presence of the first vehicle directly or via the first vehicle to a second vehicle travelling in a target lane into which the first vehicle is to move,
  an acquirer configured to acquire a size of a merging space that is to be provided by the second vehicle for merging of the first vehicle,
  a communicator configured to receive, from the notifier or from the first vehicle, the notification provided by the notifier, and
  a controller configured to execute driving control for autonomous operation or assisted operation during travel on a road, the vehicle comprising at least the notifier and the controller, wherein:
the acquirer is configured to, in a case where the first vehicle is travelling under autonomous operation or assisted operation, acquire the size of the merging space such that the size of the merging space is longer than when acquired in a case where the first vehicle is travelling under manual operation,
the controller is configured to, in response to the communicator receiving the notification provided by the notifier, serve as the controller of the second vehicle, and execute driving control for autonomous operation or assisted operation to create the merging space having the size acquired by the acquirer, and the notifier is configured to provide the notification to the second vehicle travelling in the target lane in one or both of two cases, the two cases comprising:
  a first case in which the first vehicle is to move from a lane of a merging road to a lane of a main road; and
  a second case in which the first vehicle is to move to an adjacent lane of a road on which the first vehicle is currently travelling.

15. A vehicle driving support system for supporting driving of a vehicle that travels on a road, the vehicle driving support system comprising circuitry configured to:
  in response to a request from a first vehicle that attempts to move between lanes, provide notification of presence of the first vehicle to a second vehicle travelling in a target lane into which the first vehicle is to move;
  acquire a size of a merging space that is to be provided by the second vehicle for merging of the first vehicle; and
  in a case where the first vehicle is travelling under autonomous operation or assisted operation, acquire the size of the merging space such that the size of the merging space is longer than when acquired in a case where the first vehicle is travelling under manual operation,
wherein the notification to the second vehicle travelling in the target lane is provided in one or both of two cases, the two cases comprising:
  a first case in which the first vehicle is to move from a lane of a merging road to a lane of a main road; and
  a second case in which the first vehicle is to move to an adjacent lane of a road on which the first vehicle is currently travelling.

16. A vehicle driving support system for supporting driving of a vehicle that travels on a road, the vehicle driving support system comprising:
  a notifier configured to, in response to a request from a first vehicle that attempts to move between lanes, provide notification of presence of the first vehicle to a second vehicle travelling in a target lane into which the first vehicle is to move; and
  an acquirer configured to acquire a size of a merging space that is to be provided by the second vehicle for merging of the first vehicle, wherein:
the acquirer is configured to:
  in a case where the first vehicle is travelling under autonomous operation or assisted operation, acquire the size of the merging space such that the size of the merging space is longer than when acquired in a case where the first vehicle is travelling under manual operation,
  in the case where the first vehicle is travelling under manual operation, acquire the size of the merging space based on at least a size of the first vehicle, and
  in the case where the first vehicle is travelling under autonomous operation or assisted operation, acquire the size of the merging space based on at least the size of the first vehicle, and a speed of the first vehicle or on a difference in speed between the first vehicle and the second vehicle.

\* \* \* \* \*